US010705985B1

(12) United States Patent
Pollak et al.

(10) Patent No.: US 10,705,985 B1
(45) Date of Patent: Jul. 7, 2020

(54) INTEGRATED CIRCUIT WITH RATE LIMITING

(71) Applicant: Amazon Technologies, Inc., Seattle, WA (US)

(72) Inventors: Benny Pollak, Yad-Binyamin (IL); Dana Michelle Vantrease, Austin, TX (US); Adi Habusha, Moshav Alonei Abba (IL)

(73) Assignee: Amazon Technologies, Inc., Seattle, WA (US)

( * ) Notice: Subject to any disclaimer, the term of this patent is extended or adjusted under 35 U.S.C. 154(b) by 47 days.

(21) Appl. No.: 15/918,930

(22) Filed: Mar. 12, 2018

(51) Int. Cl.
*G06F 12/00* (2006.01)
*G06F 13/00* (2006.01)
*G06F 13/16* (2006.01)

(52) U.S. Cl.
CPC ...... *G06F 13/1642* (2013.01); *G06F 13/1673* (2013.01)

(58) Field of Classification Search
CPC .......................... G06F 13/1642; G06F 13/1673
USPC ........................................................ 711/163
See application file for complete search history.

(56) References Cited

U.S. PATENT DOCUMENTS

| | | | |
|---|---|---|---|
| 7,227,840 B1 * | 6/2007 | Ferguson | H04L 47/10 370/230 |
| 9,654,483 B1 * | 5/2017 | Benson | H04L 63/108 |
| 9,798,375 B1 * | 10/2017 | Becker | G06F 1/3234 |
| 9,971,390 B1 * | 5/2018 | Becker | G06F 1/28 |
| 10,257,098 B1 * | 4/2019 | Banse | H04L 47/20 |
| 2003/0223370 A1 * | 12/2003 | Jain | H04L 47/10 370/235 |
| 2004/0213276 A1 * | 10/2004 | Yamada | H04L 12/5602 370/412 |
| 2006/0062144 A1 * | 3/2006 | Testa | H04L 47/10 370/229 |
| 2008/0077721 A1 * | 3/2008 | Terakawa | G06F 9/5011 710/240 |
| 2008/0112313 A1 * | 5/2008 | Terakawa | G06F 9/5011 370/229 |
| 2012/0057605 A1 * | 3/2012 | Ueta | H04L 47/215 370/450 |
| 2013/0242742 A1 * | 9/2013 | Nishimura | H04L 47/20 370/235.1 |

(Continued)

*Primary Examiner* — Sheng Jen Tsai
(74) *Attorney, Agent, or Firm* — Kilpatrick Townswend & Stockton LLP

(57) ABSTRACT

In various implementations, provided are systems and methods for an integrated circuit implementing a processor that can include a rate limiting circuit that attempts to fairly distribute processor memory bandwidth between transaction generators in the processor. The rate limiting circuit can maintain a count of tokens for each transaction generator, where a transaction generator can only transmit a transaction when the transaction generator has enough tokens to do so. Each transaction generator can send a request to the rate limiting circuit when the transaction generator wants to transmit a transaction. The rate limiting circuit can then check whether the transaction generator has sufficient tokens to transmit the transaction. When the transaction generator has enough tokens, the rate limiting circuit will allow the transaction to enter the interconnect. When the transaction generator does not have enough tokens, the rate limiting circuit will not allow the transaction to enter the interconnect.

20 Claims, 9 Drawing Sheets

(56) References Cited

U.S. PATENT DOCUMENTS

| | | | | |
|---|---|---|---|---|
| 2014/0047201 A1* | 2/2014 | Mehta | G06F 13/00 | 711/158 |
| 2014/0052938 A1* | 2/2014 | Kim | G06F 12/00 | 711/154 |
| 2014/0112147 A1* | 4/2014 | Esposito | H04L 47/215 | 370/235.1 |
| 2014/0189700 A1* | 7/2014 | Williams | G06F 13/1642 | 718/104 |
| 2014/0328196 A1* | 11/2014 | Arad | H04L 41/147 | 370/252 |
| 2014/0376368 A1* | 12/2014 | Xiao | H04L 47/12 | 370/230 |
| 2014/0379506 A1* | 12/2014 | Marshall | H04L 47/12 | 705/26.1 |
| 2014/0379922 A1* | 12/2014 | Xiao | H04L 47/70 | 709/226 |
| 2014/0380324 A1* | 12/2014 | Xiao | G06F 9/5083 | 718/102 |
| 2014/0380330 A1* | 12/2014 | Xiao | G06F 9/5083 | 718/104 |
| 2015/0293709 A1* | 10/2015 | Quach | G06F 13/1605 | 711/105 |
| 2016/0117105 A1* | 4/2016 | Thangaraj | G06F 3/0616 | 711/103 |
| 2016/0342391 A1* | 11/2016 | Hathorn | G06F 13/126 | |
| 2016/0342549 A1* | 11/2016 | Hathorn | G06F 13/4027 | |
| 2017/0249104 A1* | 8/2017 | Moon | G06F 13/37 | |
| 2018/0059945 A1* | 3/2018 | Helmick | G06F 3/0656 | |
| 2018/0203807 A1* | 7/2018 | Krueger | G06F 12/0875 | |
| 2019/0052938 A1* | 2/2019 | Srinivasan | H04N 21/6379 | |
| 2019/0129406 A1* | 5/2019 | Cella | G05B 23/0294 | |

* cited by examiner

INTEGRATED CIRCUIT WITH RATE LIMITING

BACKGROUND

Computer architectures include processors and processor memory, among other hardware components. Processors, which can also be referred to as central processing units (CPUs), can execute instructions that cause the processors to perform the operations for executing software applications. A computer can include one processor or multiple processors. A single processor can have multiple processing cores.

Processor memory is the memory used by a processor for temporary storage of data being used by or operated on by the processor. Processor memory is often implemented using a type of Dynamic Random Access Memory (DRAM), though it can be implemented with other volatile memory types. A processor can include one or more channels for communicating with processor memory, which is normally located off-chip from the processor.

To connect processing cores in the processor to the memory channels, the processor can include an interconnect. The interconnect can include wiring and logic to efficiently move data across the chip. In some cases, the interconnect can also include logic for optimizing the transfer of data, such as a cache memory.

BRIEF DESCRIPTION OF THE DRAWINGS

Various embodiments in accordance with the present disclosure will be described with reference to the drawings, in which.

DETAILED DESCRIPTION

Figure 1:
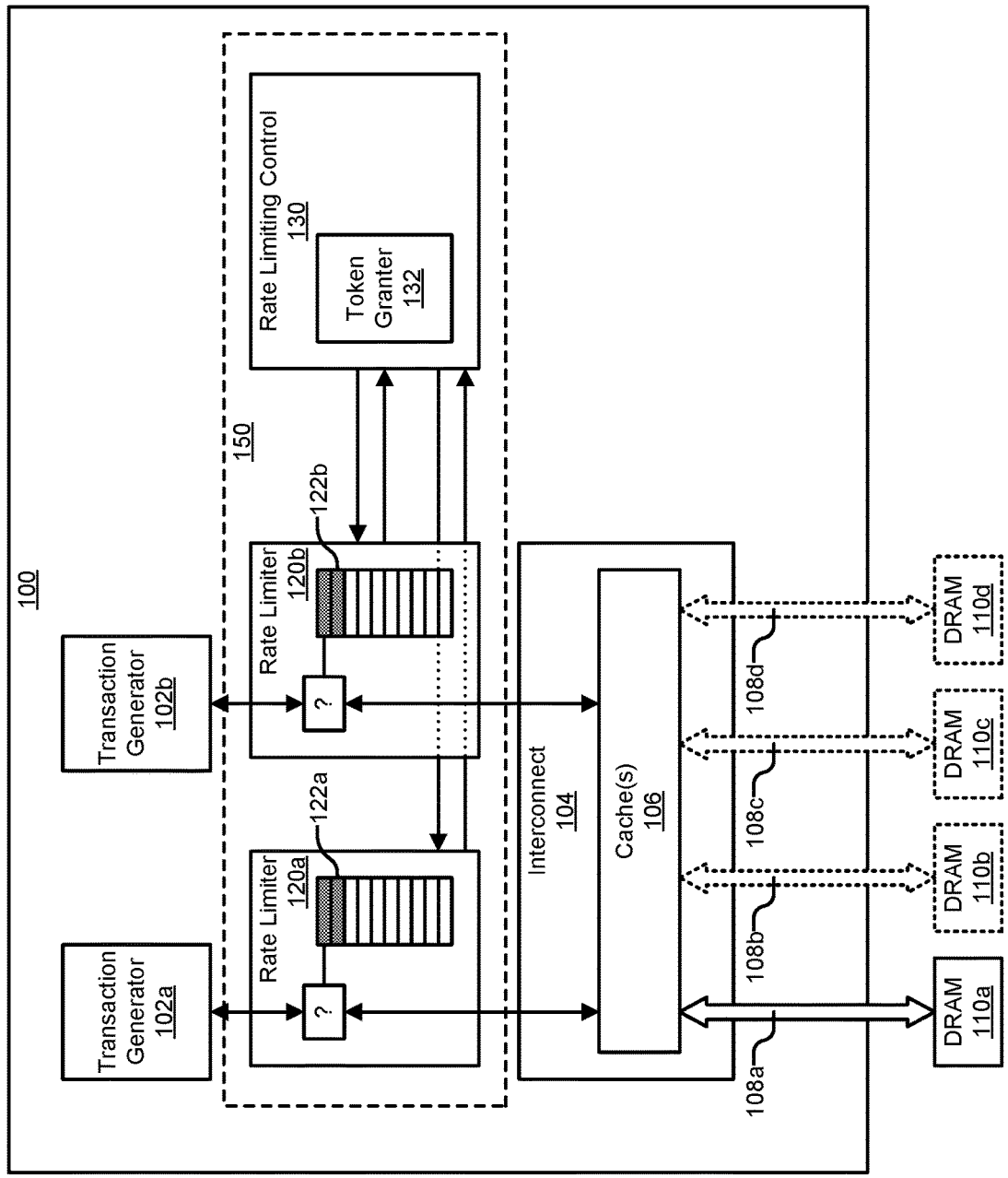
FIG. 1 illustrates an example of an integrated circuit that includes a rate limiting circuit.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Computer architectures include processors and processor memory, among other hardware components. Processors, which can also be referred to as central processing units (CPUs), can execute instructions that cause the processors to perform the operations for executing software applications. Such software applications can include virtual machines, which provide a virtual hardware and software platform within which additional software application can be run. These additional software applications are often referred to as guest applications.

A computer can include one processor or multiple processors, where each processor is able to independently execute a set of instructions. A single processor can have multiple processing cores, where each core can also independently execute a set of instructions. A processing core is the computation engine of a processor, fetching instructions and data on every clock cycle, executing computations, outputting data, and making decisions about the next instructions to fetch. Having multiple processors and/or multiple processing cores provides a computer with one way to execute multiple applications at the same time. For example, the computer can execute multiple virtual machines, where each virtual machine runs on one or more processors and/or processing cores. In this example, a processor and/or processing core supports the virtual machine to which the processor and/or processing core is assigned by executing the instructions for any code that is executing within the virtual machine.

In addition to processing cores, a processor can include other components that can generate transactions to processor memory. For example, the processor can include a graphics processing unit (GPU), a Peripheral Component Interconnect (PCI) interface, a Design for Test (DFT) interface, a Remote Network Interface (RNI), a Serial Peripheral Interface (SPI), a General Purpose Input/Output (GPIO) interface, a Direct Memory Access unit, a custom component, or another component that is able to generate transactions to processor memory. Components of a processor that can generate transactions to processor memory will be referred to herein as transaction generators.

Processor memory is the memory used by a processor for temporary storage of data being used by or operated on by the processor. For example, sections of code for applications that are currently running can be stored in the processor memory, while sections of code that are not immediately needed can be stored elsewhere, such as on disk. As another example, a file that is being read from and/or written to can be temporarily stored in processor memory, until the read or write operations are done, at which point the file can be transferred to disk. Processor memory is often referred to as Dynamic Random Access Memory (DRAM) because processor memory is often implemented using a DRAM-based technology, such as Double Data Rate (DDR) RAM or Synchronous DRAM (SDRAM), among others. Processor memory, however, can be implemented with other volatile memory types, and/or, in some cases, with non-volatile types of memory.

A processor can include a channel for communicating with processor memory, where the channel provides an interface to the processor memory. The channel can, for example, manager the transfer of data to and from the processor memory, so that the processor only needs to queue a transaction in the channel. In various implementations, a processor can have multiple memory channels, where each channel can enable communication with a different set of memory modules.

To connect transaction generators in the processor to the memory channels, the processor can include an interconnect. The interconnect can include wiring and logic to efficiently move data across the chip. In some cases, an interconnect can implement a standardized bus protocol, such as Advanced Microcontroller Bus Architecture (AMBA) or a variant of AMBA. In some cases, an interconnect can also include logic for optimizing the transfer of data. For example, the interconnect can include a cache memory, which can store data most recently accessed by the transaction generators. In this example, when the cache has data that a transaction generator needs, the interconnect can provide the data from the cache instead of reading the data from the processor memory.

Memory channels can have a certain bandwidth, which may be limited by the speed of the memory modules attached to the memory channels. For example, a set of two memory channels each connected to a double data rate module executing at 400 MHz may have a combined bandwidth of 12.8 gigabytes per second (GB/s), where 12.8 GB of data can be transferred over the channels every second. Transaction generators, however, can often generate memory transactions much faster than the transactions can be serviced by the memory channels. For example, a 64-core processor running at 1.5 GHz can produce transactions that amount to 768 GB/s, assuming each transaction transfers 8 bytes of data and each core produces one transaction per clock.

In some computer architectures, it may be desirable to ensure that each of the transaction generators in a processor receive an equal share of the available memory channel bandwidth. For example, the processor may be executing multiple virtual machines, where each virtual machine is supported by one or more transaction generators. In this example, each virtual machine may be controlled by different, unrelated entities, such as is the case when a computer is operating in a data center in a multi-tenant environment. In a data center, each virtual machine executing on a computer may be assigned to a different users, and the activities of one user should not be allowed to affect the activities of other user. When the transaction generators supporting one virtual machine monopolize the processor memory bandwidth, other virtual machines may slow down while the transaction generators supporting these virtual machines wait for access to processor memory. In these and other examples, the architecture of the computer should attempt to fairly distribute processor memory bandwidth among transaction generators.

In some computer architectures, it may be desirable for different transaction generators to have different shares of the available memory channel bandwidth. For example, in some cases, processing cores should have access to more bandwidth than Input/Output (I/O) interfaces. As another example, one set of processing cores may be assigned more bandwidth than another set of processing cores. In these and other examples, the distribution of memory channel bandwidth among transaction generators can be programmed by software, and/or a default distribution may be pre-programmed or hardwired into the system.

The interconnect in a processor may present several obstacles to distributing processor memory bandwidth between transaction generators. For example, when a memory channel becomes full or nearly full, the interconnect may push back when a transaction generator attempts to transmit a transaction. In this example, the push back mechanism can take the form of a retry, meaning that the interconnect informs the transaction generator that the transaction generator should retry the transaction later. How much later the transaction should be retried may not be clear, however, and when many transaction generators are attempting to use the memory channel it may take many clock cycles before a retried transaction is accepted. Thus the latency between the time the transaction generator first attempts to transmit the transaction and when the transaction is accepted by the memory channel may be both long and indeterminate.

Another obstacle to fair sharing of processor memory bandwidth is the presented by the cache when the interconnect has a cache. On a cache hit, no memory transaction is queued in the memory channel because the cache can provide the data on a read, and store the data on a write. On a cache miss, however, in some cases, two transactions may be queued in the memory channel: one to write data being evicted from the cache, and one to read the data that was requested by the processor. The actual processor memory bandwidth used by a transaction generator may thus be increased or decreased because of the cache. Because the memory usage by the transaction generators is dependent on the code being executed by the transaction generators, the effect of the cache on the transaction generators' bandwidth may not be predictable.

The interconnect may also not be optimized to share processor memory bandwidth so that unused bandwidth stays with the transaction generators supporting the same virtual machine. When a transaction generator does not need to issue processor memory transactions, the interconnect may be optimized to accept transactions from another transaction generator, such as the transaction generator with the most demand or the transaction generator that has been least recently serviced or a transaction generator selected based on a round-robin or priority scheme. The selected transaction generator, however, may be supporting a virtual machine that is different from the virtual machine supported by the transaction generator that is not issuing memory transactions. In this scenario, the bandwidth allocated to one virtual machine may thus be given to another virtual machine, given the latter virtual machine more bandwidth than the rest.

In various implementations, an integrated circuit implementing a processor can include a rate limiting circuit that attempts to fairly distribute processor memory bandwidth between transaction generators in the processor. In various implementations, the rate limiting circuit can maintain a count of tokens for each transaction generator, where a transaction generator can only transmit a transaction when the transaction generator has enough tokens to do so. Each transaction generator can send a request to the rate limiting circuit when the transaction generator wants to transmit a processor memory transaction. The rate limiting circuit can then check whether the transaction generator has sufficient tokens to transmit the transaction. When the transaction generator has enough tokens, the rate limiting circuit will allow the transaction to enter the interconnect. When the transaction generator does not have enough tokens, the rate limiting circuit will not allow the transaction to enter the interconnect. In this latter case, the transaction generator can try the transaction later, and/or can work on other operations until the transaction generator has more tokens.

In various implementations, the rate limiting circuit can further add tokens to the token counts at regular intervals. The interval can be determined based on the available processor memory channel bandwidth and the clock frequency, for example by dividing the bandwidth by the number of transaction generators and determining the number of clock cycles needed for each transaction generator to get the bandwidth assigned to the transaction generator. In various implementations, tokens are granted equally to the transaction generators, so that busy transaction generators must wait for tokens when these transaction generators use up all their tokens and less busy transaction generators have tokens available no matter how busy other transaction generators are.

In various implementations, tokens can be recycled so that unused tokens, and the bandwidth represented by the unused tokens, are used by the transaction generators that support the same virtual machine. In various implementations, the count of tokens for each transaction generator can have a maximum value, which may be configurable. When the rate limiting circuit attempts to add a token to a token count that is at the maximum value, the rate limiting circuit can instead give the token to another transaction generator. The rate limiting circuit first will look for a transaction generator that is supporting the same virtual machine, and on finding one will add to token to the count for this transaction generator. In this way, the bandwidth represented by the token remains with one virtual machine. When all the transaction generators supporting one virtual machine have the maximum number of tokens, the rate limiting circuit will then grant the token to another transaction generator, so that the bandwidth does not go unused.

In various implementations, the rate limiting circuit can also monitor the behavior of the cache in the interconnect. On cache hits, because no transaction to processor memory is needed, the rate limiting circuit can give a token back to the transaction generator that requested the transaction. On a cache miss, when an eviction occurs, the rate limiting circuit can make adjustments for the additional transaction that is generated. For example, the rate limiting circuit can deduct an additional token from the transaction generator that caused the eviction.

The bandwidth of the processor memory channel or channels of a processor can be determined from specifications, including the speed of the memory, the amount of data that can be transferred into and out of the memory per clock cycle, and the frequency of the clock, among other things. These numbers can be used to calculate a theoretical maximum bandwidth, but may not capture the available bandwidth at any given moment. When transactions are queued in the memory channels and are waiting to be sent to the processor memory, the actual bandwidth, sometimes referred to as the instantaneous bandwidth, may be less than the theoretical maximum.

To account for differences between the possible memory channel bandwidth and the actual bandwidth at any point in time, the rate limiting circuit can monitor the channel occupancy (e.g., the number of transactions queued and waiting to be transmitted). When the channels contain a certain amount of data, the rate limiting circuit can adjust the interval for adding tokens to the tokens counts. For example, when the occupancy reaches a threshold, the rate limiting circuit can increase the interval until the occupancy drops below the threshold. In some examples, when the processor has multiple channels, the rate limiting circuit can determine a combined amount of available space, and can adjust the interval based on the combined amount. In some examples, the rate limiting circuit can adjust the interval based on the individual available space in each channel.

Adding a rate limiting circuit that includes one or more of the features described above can enable an integrated circuit to distribute processor memory bandwidth among multiple transaction generators, where the distribution attempts to be even and fair. The rate limiting circuit can have the additional benefit of reducing retries from the interconnect by avoiding having the memory channels become so full that the interconnect requires retries. Reducing retries and other features, such as monitoring cache behavior and memory channel occupancy, can have the additional benefit of removing indeterminate delays, and thus making transaction latency more predictable.

FIG. 1 illustrates an example of an integrated circuit 100 that includes a rate limiting circuit 150 that manages transactions issued by multiple transaction generators 102a-102b to one or more memory channels 108a-108d. The integrated circuit 100 also includes an interconnect 104 that enables data to be transferred between the transaction generators 102a-102b and the memory channels 108a-108d. In the illustrated example, each of the memory channels 108a-108d is connected to processor memory, located outside of the integrated circuit 100. In the example of FIG. 1, the processor memory is illustrated as DRAM 110a-110d modules. As noted above, in other examples, other memory types can be used for processor memory. The example integrated circuit 100 can be part of a larger integrated circuit, such as a processor.

Each of the transaction generators 102a-102b can generate transactions to the DRAM 110a-110d. These transactions can include read transactions for reading data from the DRAM 110a-110d and write transactions for writing data to the DRAM 110a-110d. In some implementations, each of the transaction generators 102a-102b can send transactions to any of the DRAM 110a-110d modules. In some implementations, the transaction generators 102a-102b may be configured to send transactions only to specific DRAM 110a-110d modules. The example of FIG. 1 illustrates two transaction generators, and in other examples, the integrated circuit 100 can have more transaction generators, such as 32, 64, 128, or more transaction generators.

Processor memory transactions from the transaction generators 102a-102b are received by the interconnect 104, which can route the transactions to an appropriate memory channel 108a-108d. In the illustrated example, the interconnect 104 includes a cache 106 or multiple caches. The cache 106 can store data that was recently accessed by a transaction generator. For example, when a transaction generator reads data from the DRAM 110a-110d, the data read can be stored in the cache 106. In this example, should the transaction generator need to read the same data again, the interconnect 104 can provide the data from the cache 106, rather than reading the data again from the DRAM 110a-110d. As another example, when a transaction generator writes data to the DRAM 110a-110d, the interconnect 104 can store a copy of the data in the cache 106. In this example, when the transaction generator reads the data that was written, the interconnect 104 can provide the data from the cache 106 rather than reading the data from the DRAM 110a-110d. In some implementations, when data is written to the cache 106, the data is also written to the DRAM 110a-110d. In some implementations, the data is not written to the DRAM 110a-110d until the data is removed from the cache 106.

In these and other examples, the cache 106 can reduce the number of transactions queued in the memory channels 108a-108d. Space in the memory channels can thus be freed for other transactions, such as those whose data is not currently in the cache 106.

In some examples, the cache 106 can be implemented as one large memory that caches data for all the DRAM 110a-110d modules. In some examples, the cache 106 can be implemented as multiple caches. For example, the interconnect 104 can include a cache memory for each memory channel 108a-108d. In some examples, the cache 106 can be hierarchical, where a lower level cache memory operates as a cache for a higher level cache memory. For example, when the interconnect 104 receives a transaction, the interconnect 104 can check a first level cache to see if the data for the transaction is in the first level cache. In this example, when the data is not in the first level cache, the interconnect 104 can check a second level cache and additional levels of caches before sending a transaction to a memory channel.

In the illustrated example, the integrated circuit 100 includes one or more memory channels 108a-108d. The integrated circuit 100 can have as few as one memory channel. In some examples, the integrated circuit 100 can have two, four, or more memory channels. Each of the memory channels 108a-108d can be connected to one or more DRAM 110a-110d modules. In various implementations, the memory channels 108a-108d can include buffers for temporarily storing transactions. The buffers can enable the memory channels to store transactions while waiting for a transaction to DRAM 110a-110d to complete.

In various implementations, the rate limiting circuit 150 can include rate limiter 120a-120b modules and a rate limiting control 130 module. The rate limiting circuit 150 can include one rate limiter 120a-120b for each transaction generators 102a-102b. Each rate limiter 120a-1120b can maintain a count of tokens 122a-122b for the transaction generators 102a-102b with which the rate limiter 120a-120b is associated. Maintaining the tokens 122a-122b can include determining whether the count of tokens 122a-122b is equal to zero, greater than zero, and/or at a maximum value. In some implementations, the maximum value is programmable.

In various implementations, the rate limiter 120a-120b modules can also determine whether a transaction from a transaction generators 102a-102b should be allowed to enter the interconnect 104. For example, in some implementations, when a transaction generator 102a wants to send a memory transaction, the transaction generator 102a can first send a request to the rate limiter 120a assigned to the transaction generator 102a. In this example, upon receiving the request, the rate limiter 120a can check whether the transaction generator 102a has enough tokens 122a to transmit a transaction. When the transaction generator 102a has enough tokens 122a, the rate limiter 120a can allow the transaction to enter the interconnect 104. When the transaction generator 102a does not have enough tokens 122a, the rate limiter 120a can inform the transaction generator 102a that the transaction will not be allowed to enter the interconnect 104. When the transaction is not allowed to enter the interconnect 104, the transaction generator 102a can try the transaction again later and/or can work on other operations instead.

In some examples, instead of sending a request to the rate limiter 120a, the transaction generator 102a instead send the transaction as if sending the transaction directly to the interconnect 104. When the rate limiter 120a does not have sufficient tokens 122a to allow the transaction, the rate limiter 120a can send a retry signal or other signal that the transaction cannot be accepted, in the same way that the interconnect 104 would when the interconnect 104 will not accept the transaction. In these examples, the interface between the transaction generators 102a-102b and the rate limiter 120a-120b can be the same as the interface between the transaction generators 102a-102b and the interconnect 104.

In various implementations, a certain quantity of tokens can be assigned to each processor memory transactions. For example, the quantity of tokens can be one token for each transactions, such that the rate limiter 120a-120b will allow a transaction when the rate limiter's count of tokens 122a-122b is at least one. In some implementations, the quantity can be two or more tokens for each transaction. In some implementations, the number of tokens needed for each transaction can be programmed in each rate limiter 120a-120b. In these implementations, the number of tokens per transaction can be based on factors such as the current memory bandwidth utilization, the current activity level of a transaction generator, and/or other factors.

In various implementations, the rate limiting control 130 determines when the rate limiter 120a-120b modules should add tokens to the count of tokens 122a-122b. In some implementations and as discussed further below, the rate limiting control 130 can also determine which transaction generator 102a-102b should get a token. To determine when the rate limiter 120a-120b should add tokens, in various implementations, the rate limiting control 130 can include a granter 132 module. The token granter 132 can include a counter that counts clock cycles. When the counter reaches a limit, the token granter 132 can signal to each of the rate limiter 120a-120b modules to add a token to the count of tokens 122a-122b. In some implementations, the limit can be configured by software. Alternatively or additionally, in some implementations, the limit can be determine and/or adjusted by the token granter 132, given parameters such as the number of transaction generators in the integrated circuit 100, the available memory channel bandwidth, and the clock frequency, and inputs such as the current memory channel occupancy. The limit enables the rate limiting control 130 to grant tokens at intervals of time determined by the limit and the clock frequency.

Even without any knowledge about the current memory bandwidth utilization, the rate limiting circuit 150 can provide some consistency and predictability to the transactions being issued by the transaction generators 102a-102b. For example, no one transaction generator can monopolize the memory channel bandwidth by flooding the interconnect 104 with transactions, because the transaction generator will be prevented from doing so when the transaction generator runs out of tokens. As a further example, by scheduling granting of the tokens according to the available memory channel bandwidth, the rate limiting circuit 150 can avoid the memory channels 108a-108d becoming so full that the interconnect 104 must issue retries. As noted previously, reducing retries can remove the unpredictability of the latency caused by retries. As another example, the transaction generators 102a-102b can schedule memory transactions according to the bandwidth allotted to each transaction generator. In this example, when a transaction generator finds that the block does not have enough tokens to transmit a transaction, the transaction generator can schedule the transaction for a later time, when the transaction generator expects to have more tokens. In these and other examples, overall performance of the virtual machines supported by the transaction generators 102a-102b can be equalized and improved.

In some cases, a transaction generator may not have many memory transactions to send for some time. In these cases, the rate limiter assigned to the transaction generator may continue to add tokens to the token count the rate limiter is maintaining for the transaction generator. To ensure that this transaction generator does not unfairly accumulate tokens, and/or so that the rate limiter does not need to be designed to maintain an infinite number of tokens, or for some other reason, the rate limiter can stop adding tokens when the token count reaches a maximum value. In some implementations, the maximum value can be programmed for each rate limiter.

In some implementations, when rate limiter has reached the maximum number of tokens, when the rate limiting control instructs the rate limiter to add another token, the rate limiter can discard the token instead of adding another to the token count. Stated differently, the rate limiter can refrain from adding another token.

In some implementations, instead of discarding a token, the rate limiter can inform the rate limiting control that the rate limiter's token count has reached the maximum value. The rate limiting control may then attempt to recycle the token; that is, the rate limiting control may look for and give the token to another transaction generator.

Figure 2A:
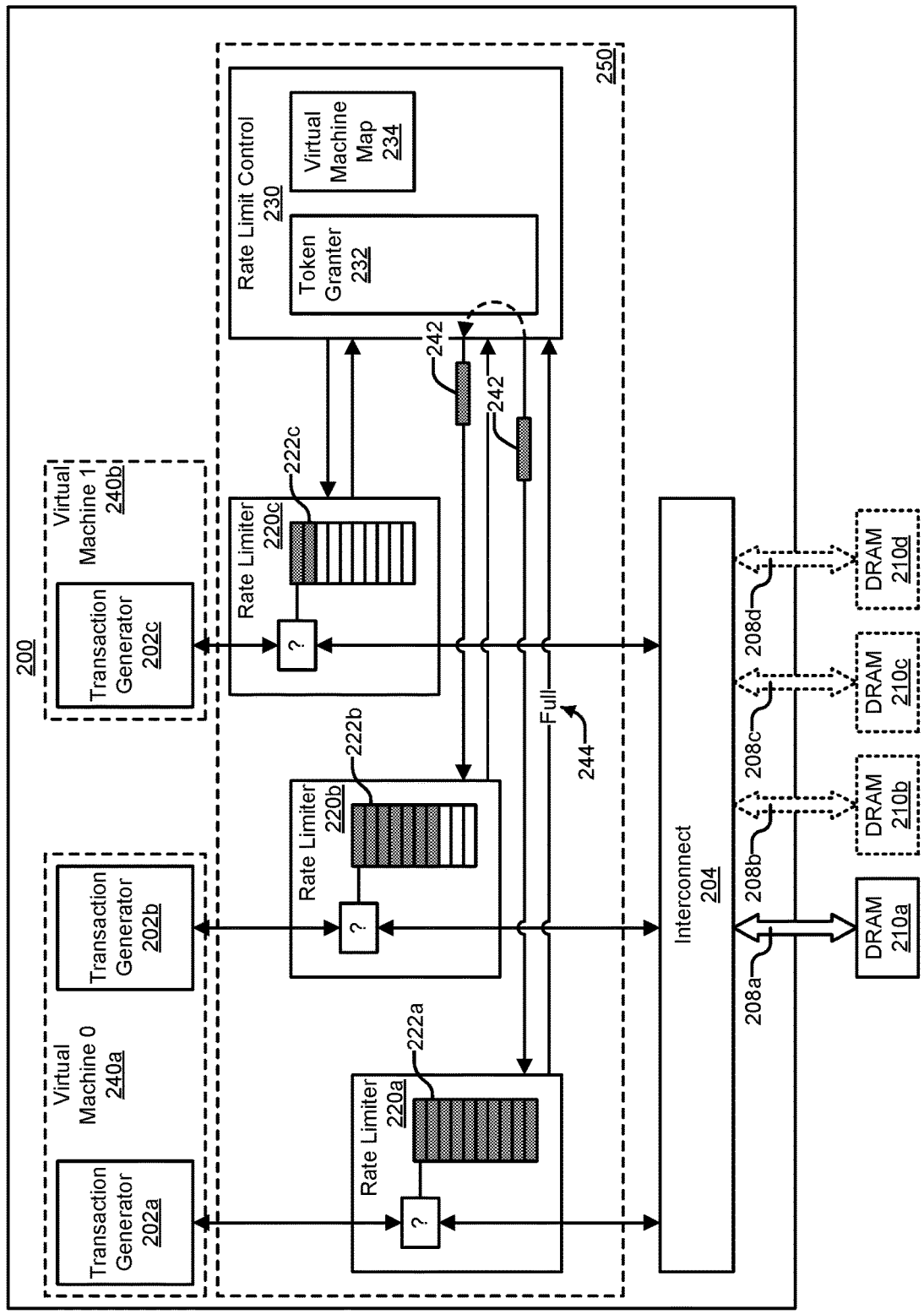
FIG. 2A-2B illustrate an example of an integrated circuit that includes a rate limiting circuit that can recycle tokens.
Figure 2B:
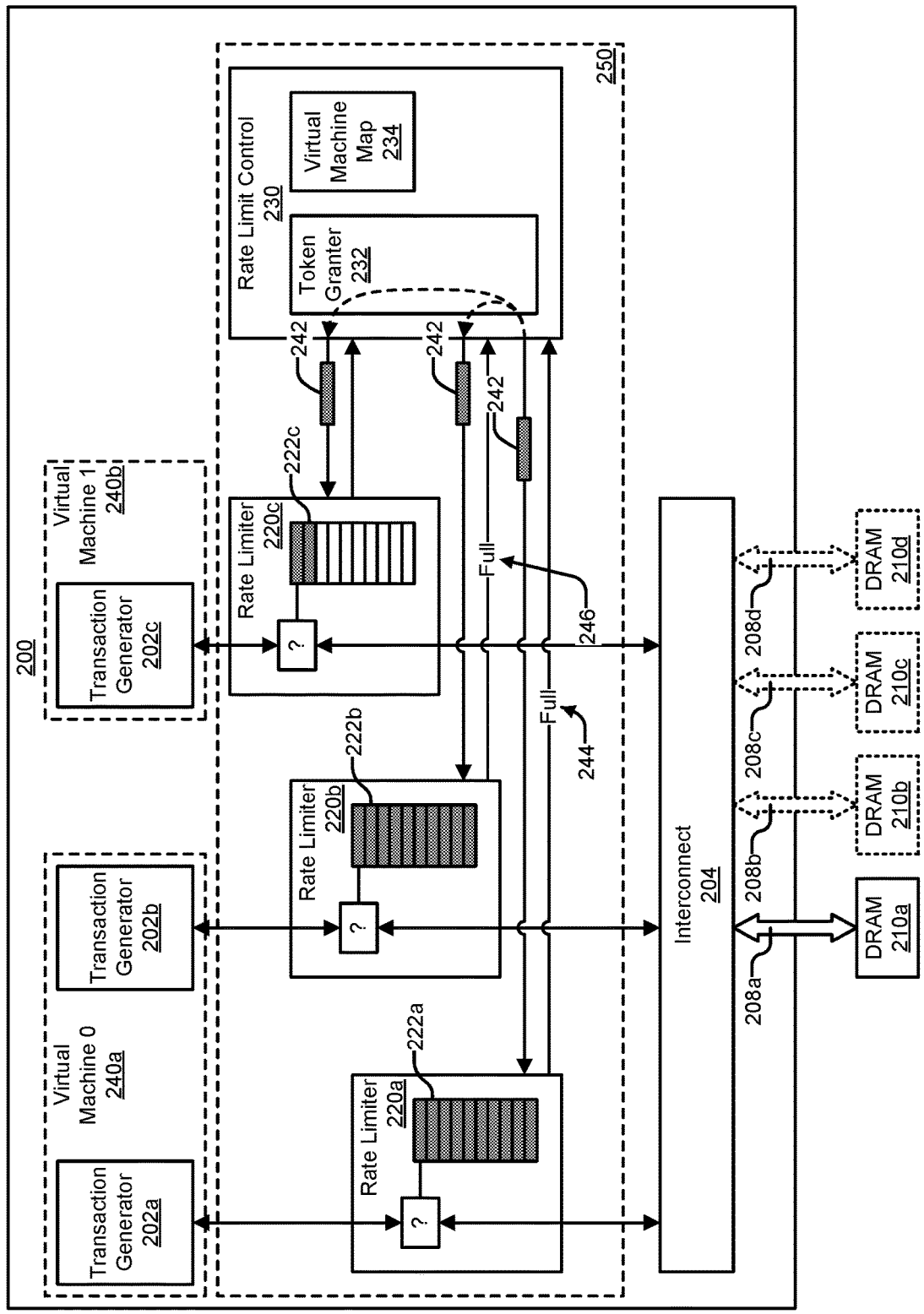

FIG. 2A-2B illustrate an example of an integrated circuit 200 that includes a rate limiting circuit 250 that can recycle tokens. The example integrated circuit 200 includes multiple transaction generators 202a-202c that can send memory transactions to processor memory (here illustrated as DRAM 210a-210d modules) located outside the integrated circuit 200. Though three transaction generators 202a-202c are illustrated here, the integrated circuit 200 can have many more transaction generators. The integrated circuit 200 also includes an interconnect 204 that enables transactions from the transaction generators 202a-202c to be transferred from the transaction generators 202a-202c to the memory channels 208a-208d and for responses from the DRAM 210a-210d to be transferred from the memory channels 208a-208d to the transaction generators 202a-202c. In some examples, the interconnect 204 can include one or more cache memories, which are not illustrated here.

In various implementations, the rate limiting circuit 250 can include rate limiter 220a-220c modules, one for each of the transaction generators 202a-202c, and a rate limiting control 230 module. The rate limiter 220a-220c modules can maintain counts of tokens 222a-222c for the transaction generator to which each rate limiter 220a-220c is assigned. The rate limiter 220a-220c modules can also determine whether a transaction from a transaction generator can be allowed to enter the interconnect 204, where the transaction is allowed when the transaction generator has enough tokens to transmit the transaction.

The rate limiting control 230 can determine when tokens should be added to the counts of tokens 222a-222c. To determine when tokens should be added, and which rate limiter 220a-220c should add a token, the rate limiting control 230 can include a token granter 232 module. In various implementations, the token granter 232 can determine whether the interval between token grants has passed. In some implementations, the token granter 232 can also determine whether a token should be recycled, as discussed further below.

As noted above, the transaction generators 202a-202b can be supporting virtual machines 240a-240b executing on the integrated circuit 200. Supporting, in this context, means that the transaction generator is executing instructions for operating the virtual machine and/or the instructions for operating guest applications running within the virtual machine. In some examples, multiple transaction generators may be supporting one virtual machine so that the virtual machine is provided with a certain level of performance.

To keep track of the virtual machines 240a-240b to which the transaction generators 202a-202c are assigned, the rate limiting control 230 can include a virtual machine map 234. The virtual machine map 234 can include a list, table, hash, or some other structure that associates each of the transaction generators 202a-202c with a virtual machine. In various implementations, the virtual machine map 234 can be programmed by software. For example, a hypervisor, which manages the virtual machines (including starting virtual machines, stopping virtual machines, and/or assigning hardware resources to the virtual machines) can program the virtual machine map 234.

In the example of FIGS. 2A-2B, a first transaction generator 202a and a second transaction generator 202b are together supporting a first virtual machine, Virtual Machine 0 240a. A third transaction generator 202c is supporting a second virtual machine, Virtual Machine 1 240b. A first rate limiter 220a controls the rate at which the first transaction generator 202a can send transactions to the interconnect 204, a second rate limiter 220b does the same for the second transaction generator 202b, and a third transaction generator 202c does the same for the third transaction generator 202c.

In the example illustrated in FIG. 2A, the count of tokens 222a maintained by the first rate limiter 220a has reached the maximum allowed amount. Thus, when the rate limiting control 230 instructs the first rate limiter 220a to add an additional token 242, the first rate limiter 220a can respond with a signal 244 indicating that the first rate limiter 220a cannot add more tokens.

Once informed that the first transaction generator 202a cannot accept any more tokens, the rate limiting control 230, for example using the token granter 232 module, can determine whether another transaction generator that is supporting the same virtual machine can take the token instead. For example, in the example of FIG. 2A, the rate limiting control 230 can use the virtual machine map 234 to determine that first transaction generator 202a is supporting Virtual Machine 0 240a. In this example, the rate limiting control 230 can further determine, from the virtual machine map 234, that Virtual Machine 0 240a is also supported by the second transaction generator 202b. Upon making this determination, the token granter 232 can see if the second rate limiter 220b can accept the token 242 previously granted to the first rate limiter 220a. In this example, the count of tokens 222b maintained by the second rate limiter 220b has not yet reached the maximum value. Thus, the second rate limiter 220b adds the token 242 and either informs the rate limiting control 230 was accepted or does not respond with an indication that the token cannot be accepted.

The token recycling illustrated in FIG. 2A can occur in the same clock cycle, or within a few clock cycles after, in which the rate limiting control 230 attempts to grant the token 242 to the first rate limiter 220a. The token granter 232 does not need to wait until the expiration of the next token grant interval. In some implementations, the token granter 232 may wait until the end of the next token grant interval, and may then attempt (per the example of FIG. 2A), to grant two tokens to the second rate limiter 220b instead of one. In either case, the token 242, and the processor memory bandwidth represented by the token 242, stays with the transaction generators that are supporting the same virtual machine so that the virtual machine is able to use all the bandwidth the virtual machine is allotted.

In some cases, however, bandwidth can be given to another virtual machine. In the example illustrated in FIG. 2B, the count of tokens 222a maintained by the first rate limiter 220a has reached the maximum amount. Thus, when the rate limiting control 230 instructs the first rate limiter 220a to add a token 242, the first rate limiter 220a can respond with a signal 244 that indicates that the first rate limiter 220a cannot add another token. As in the example of FIG. 2A, in FIG. 2B, the rate limiting control 230, for example using the token granter 232 module, next instructs the second rate limiter 220*b* to add the token 242 because the second transaction generator 202*b* is supporting the same virtual machine as is the first transaction generator 202*a*. In this example, however, the count of tokens 222*b* maintained by the second rate limiter 220*b* has also reached the maximum value. The second token count 222*b* thus responds with its own signal 246 to indicate that the second token count 222*b* cannot add the token 242.

Assuming that no other transaction generators are supporting Virtual Machine 0 240*a* (or, if there are additional transaction generators, that all of these transaction generators have the maximum number of tokens), the rate limiting control 230 can now determine to discard the token 242, or to give the token to another transaction generator. Discarding the token 242 would maintain the fairness among the virtual machines 240*a*-240*b* because no other virtual machine would receive bandwidth assigned to another virtual machine. Given the token to another transaction generator attempts to ensure that no bandwidth goes unused. In various implementations, the rate limiting control 230 can be programmed whether to discard or recycle tokens.

In the example of FIG. 2B, the rate limiting control 230, for example using the token granter 232, attempts to give the token 242 to the third transaction generator 202*c*. In this example, the count of tokens 222*c* maintained by the third rate limiter 220*c* has not reached the maximum value, so the third rate limiter 220*c* adds the token 242 and either informs the rate limiting control 230 that the token 242 was accepted or refrains from signaling that the token 242 was not accepted.

The rate limiting control 230 may use various techniques for selecting third transaction generator 202*c* as the transaction generator to receive the token 242. For example, the token granter 232 can implement a round-robin scheme, in which the next transaction generator or virtual machine, in numerical order, is selected. As another example, the token granter 232 can keep track of transaction generators that have recently declined accepting tokens and/or transaction generators that have indicated that they have run out of tokens. Alternatively or additionally, software can program priorities for transaction generators and/or virtual machines. The virtual machine map 234, for example, can include additional fields for each transaction generator to store full, empty, and/or priority information. In some implementations, the token granter 232 can use full and empty token count indicators, and/or other information, to prioritize which transaction generator and/or virtual machine should receive recycled tokens.

Figure 3:
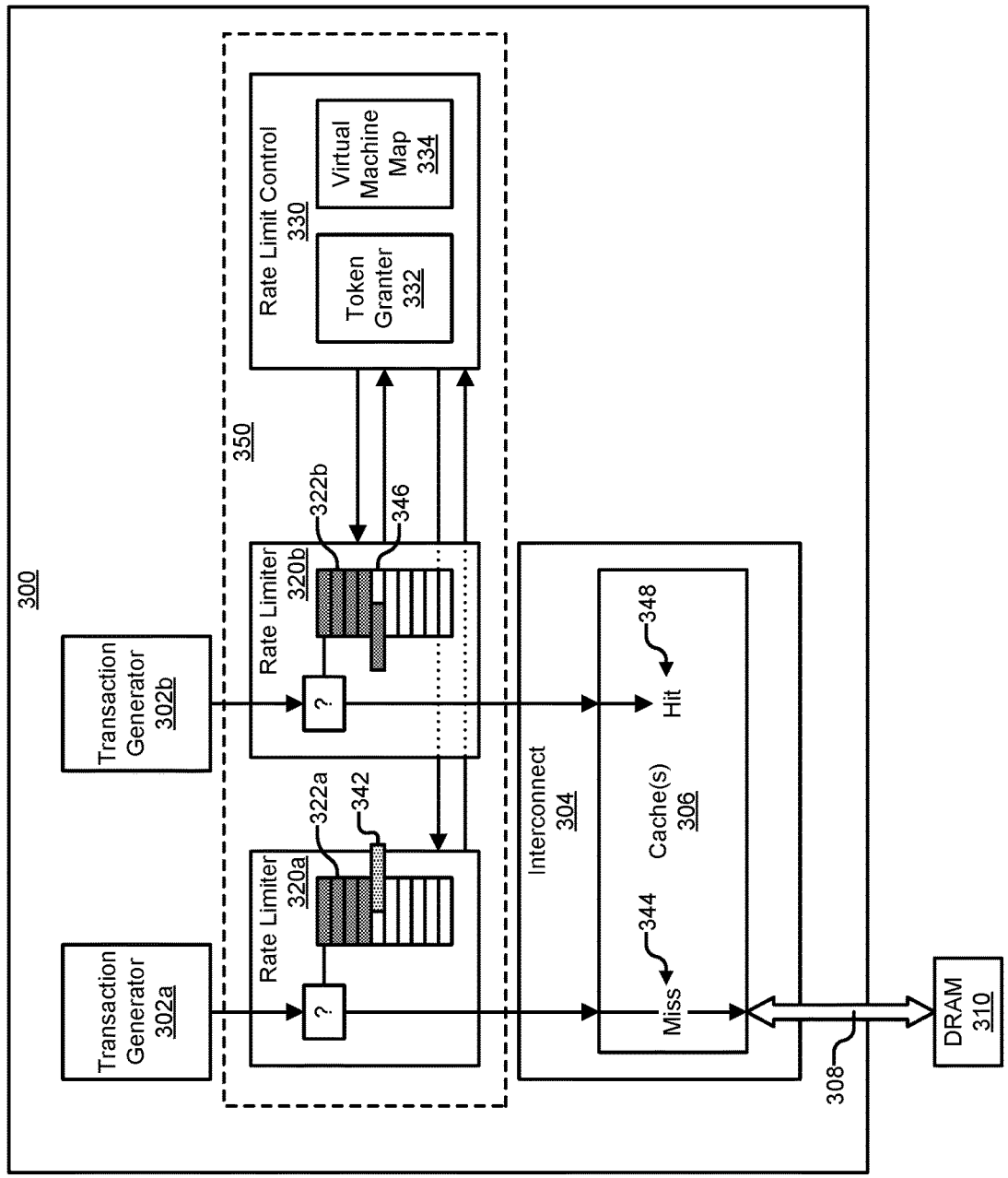
FIG. 3 illustrates an example of an integrated circuit that includes a rate limiting circuit that can recycle tokens.

Token recycling can also occur when an interconnect includes a cache. FIG. 3 illustrates an example of an integrated circuit 300 that includes a rate limiting circuit 350 that can recycle tokens. The example integrated circuit 300 includes multiple transaction generators 302*a*-302*b* that can send memory transactions to processor memory (here illustrated as DRAM 310 modules) located outside the integrated circuit 300. In other examples, the integrated circuit 300 can include more than two transaction generators and/or more than one memory channel and DRAM module. The integrated circuit 300 also includes an interconnect 304 that enables transactions from the transaction generators 302*a*-302*b* to be transferred from the transaction generators 302*a*-302*b* to the memory channel 308 and for responses from the DRAM 310 to be transferred from the memory channel 308 to the transaction generators 302*a*-302*b*.

In various implementations, the rate limiting circuit 350 can include rate limiter 320*a*-320*b* modules, one for each of the transaction generators 302*a*-302*b*, and a rate limiting control 330 module. The rate limiter 320*a*-320*b* modules can maintain counts of tokens 322*a*-322*b* for the transaction generator to which each rate limiter 320*a*-320*b* is assigned. The rate limiter 320*a*-320*b* modules can also determine whether a transaction from a transaction generator can be allowed to enter the interconnect 304, where the transaction is allowed when the transaction generator has enough tokens to transmit the transaction.

The rate limiting control 330 can determine when tokens should be added to the counts of tokens 322*a*-322*b*. To determine when tokens should be added, and which rate limiter 320*a*-320*b* should add a token, the rate limiting control 330 can include a token granter 332 module. In various implementations, the token granter 332 can determine whether the interval between token grants has passed. In some implementations, the token granter 332 can also determine whether a token should be recycled, as discussed further below. In various implementations, the rate limiting control 330 can also include a virtual machine map 334 that can be used to identify the virtual machine being supported by each of the transaction generators 302*a*-302*b*.

As discussed above, the cache 306 in the interconnect 304 can enable the interconnect 304 to handle transactions more quickly and efficiently. By storing recently accessed data in the cache 306, the interconnect 304 can avoid sending processor memory transactions to the DRAM 310. Returning (on reads) or storing (on writes) data in the cache 306 can be much quicker than reading or writing the DRAM 310, which can be even slower when the memory channel 308 backs up. In various implementations, the cache 306 can be one memory, multiple memories representing individual caches (e.g., one cache per memory channel), and/or can be a series of hierarchical cache memories.

In various implementations, the rate limiting circuit 350 can account for cache hits and misses when granting tokens to the transaction generators 302*a*-302*b*. For example, in the example illustrated in FIG. 3, a first rate limiter 320*a*, which is assigned to a first transaction generator 302*a*, determines that a transaction from the first transaction generator 302*a* can enter the interconnect 304. Upon making this determination, the first rate limiter 320*a* will deduct a token 342 from the count of tokens 322*a* being maintained by the first rate limiter 320*a*.

Continuing the example of FIG. 3, the interconnect 304 can check whether the data associated with the transaction is in the cache 306. On doing so, the interconnect 304 determines that the data is not in the cache 306 (a cache miss 344 condition). When the transaction is a read transaction, the interconnect 304 can transfer the transaction to the memory channel 308 so that the data can be read from the DRAM 310. When the transaction is a write transaction, in some cases the interconnect 304 can write the data to the cache 306 and also send a write transaction to the memory channel 308 so that the data in the DRAM 310 is kept up-to-date. In this particular example, no data is removed from the cache, which can occur when the transaction corresponds to an unoccupied or invalid cache line.

In this example, the first rate limiter 320*a* can be informed that a miss 344 occurred. For example, the interconnect 304 may include signals in its interface with the first rate limiter 320*a* that indicate whether a cache miss or hit occurred. As another example, the first rate limiter 320*a* and/or the rate limiting control 330 may be able to snoop (e.g., monitor or watch) transactions entering and/or leaving the cache 306 to determine whether a cache hit or miss occurred. In the particular example discussed above, the cache miss 344 resulted in one transaction being sent to the DRAM 310, and thus the first rate limiter 320a does not need to take any further action after deducting the token 342.

As further example, in the example illustrated in FIG. 3, a second rate limiter 320b, assigned to a second transaction generator 302b, also determines that a transaction from the second transaction generator 302b can enter the interconnect 304, and deducts a token 346 upon making this determination. In this case, the interconnect 304 determines that the data associated with the transaction is in the cache 306 (a cache hit 348 condition). When the transaction is a read transaction, a cache hit 348 occurs when the data being read is in the cache 306. when the transaction is a write transaction, a cache hit 348 occurs when the data is written to the cache without the data also being written to the DRAM 310.

In the example illustrated with second transaction generator 302b, no transaction is send to the DRAM 310. Because no memory channel bandwidth is used, the second rate limiter 320b can add the token 346 back to the count of tokens 322b, thereby recycling the bandwidth represented by the token 346. This example thus illustrates a technique by which unused bandwidth is not wasted.

In some cases, by the time the token 346 is added back to the count of tokens 332b, the count of tokens 332b may have reached a maximum value. For example, the rate limit control 330 may have added one or more tokens to the count of tokens 332b between the time the transaction from the second transaction generator 302b entered the interconnect 304 and the time the token 346 is added back to the count of tokens 332b. In some implementations, when this situation occurs, the rate limiter 320b may be configured to drop or discard the returned token 346. In some implementations, the rate limiter 320b may be able to count tokens over the maximum value. In these implementations, the bandwidth represented by the token remains available to the transaction generator 302b. In various implementations, whether the rate limiters 320a-320b keep or discard returned tokens when the count of tokens 332a-332b is at a maximum can be configurable.

Returning to the example illustrated with first transaction generator 302a, in some cases, a cache miss 344 can occur on a cache line that has valid data. Caching schemes map cache lines to compressed forms of processor addresses, thus multiple processor addresses can map to the same cache line. A cache line may be storing data recently accessed using one processor address, and then subsequently be needed to store data for a different processor address. This scenario can result in a cache miss 344 with old data being evicted from the cache 306. Upon eviction, the data may be written to the DRAM 310, for example because the data in the cache is more up-to-date than the data in the DRAM 310. A cache miss 344 with an eviction can thus result in two transactions being sent to the DRAM 310.

In various implementations, the rate limiting circuit 350 can attempt to account for cache evictions. For example, in some implementations, the token grant interval can be computed to account for a certain rate of evictions. For example, it can be assumed that one in every 100 (or some other number) of transactions will result in an eviction, and thus that evictions will occupy 1% over the available bandwidth. In this example, the 1% bandwidth can be deducted equally from the bandwidth allotted to each of the transaction generators 302a-302b. Reducing the bandwidth can be accomplished, for example, by not granting tokens to any of the token generators 302a-302b for one or more token granting intervals.

As another example, in some implementations, the rate limiter 320a-320b can deduct an additional token when an eviction occurs, where the additional token accounts for the additional transaction needed for the eviction. In these implementations, the count of tokens 322a-322b can implemented to include negative values, or the rate limiter 320a-320b modules can include a separate token count for the negative tokens. In these implementations, differences in memory usage can be accommodated. For example, some applications may cause evictions frequently, while others do not. In this example, the transaction generators supporting applications whose memory usage cause frequent evictions may be restricted to using only the bandwidth allotted to these transaction generators.

As another example, in some implementations, the rate limiter 320a-320b can sometimes require that the count of tokens 322a-322b be enough for both the transaction issued by the transaction generator 302a-302b and for a transaction that may be generated due to an eviction. For example, a count of tokens 322a-322b may need to be at least two to send a transaction when each token is worth one transaction. In some examples, enough tokens for transactions may always be required. In some examples, software may enable the requirement for there to be enough tokens for two transactions. In some examples, the requirement may be enabled by the rate limiter circuit 350 when the bandwidth of the DRAM channel falls below a threshold.

Alternatively, in some implementations, the rate limiting circuit 350 can assume that evictions affect the bandwidth of each of the transaction generators 302a-302b equally, and thus that no adjustments to the granting of tokens needs to be made.

As noted previously, the rate at which tokens are granted to transaction generators can be determined from the available memory channel bandwidth. The memory channel bandwidth can be a function of the particular memory modules used for the processor memory. For example, a DDR memory module may be capable of running at 400 megahertz (MHz), and, being double data rate, can transfer two lines of data per clock. In this example, assuming one line of data is 64 bits and the processor has two memory channels, the overall memory bandwidth of the processor is 12.8 GB/s (400,000,000 clocks per second×2 lines per clock×64 bits per line×2 memory channels).

Using 12.8 GB/s as an example available memory channel bandwidth, an example processor with 64 transaction generators would have 200 megabytes/second (MB/s) of bandwidth allotted to each transaction generator. Assuming the transaction generators are running at 1 GHz and that a processor memory transaction transfers 64 bits of data to or from processor memory, and assuming one token is worth 64 bits of data, then the interval for granting tokens to each transaction generator would be once every 40 clocks (200 MB/s×1 transaction per 64 bits×1,000,000,000 clocks per second).

The preceding example, however, assumes that the maximum theoretical bandwidth is always available, which may not be the case. The actual bandwidth usage may fluctuate, with the available bandwidth being less when the memory channels have many transactions queued.

In various implementations, a rate limiting circuit can monitor the memory channels, and can adjust the rate at which transaction generators receive tokens. In this way, the transaction generators must slow down the rate at which the transaction generators issue transactions. Once transactions have drained from the memory channels, the rate limiting circuit can increase the token granting rate. The bandwidth available at a point in time is sometimes referred to as the instantaneous bandwidth.

Figure 4:
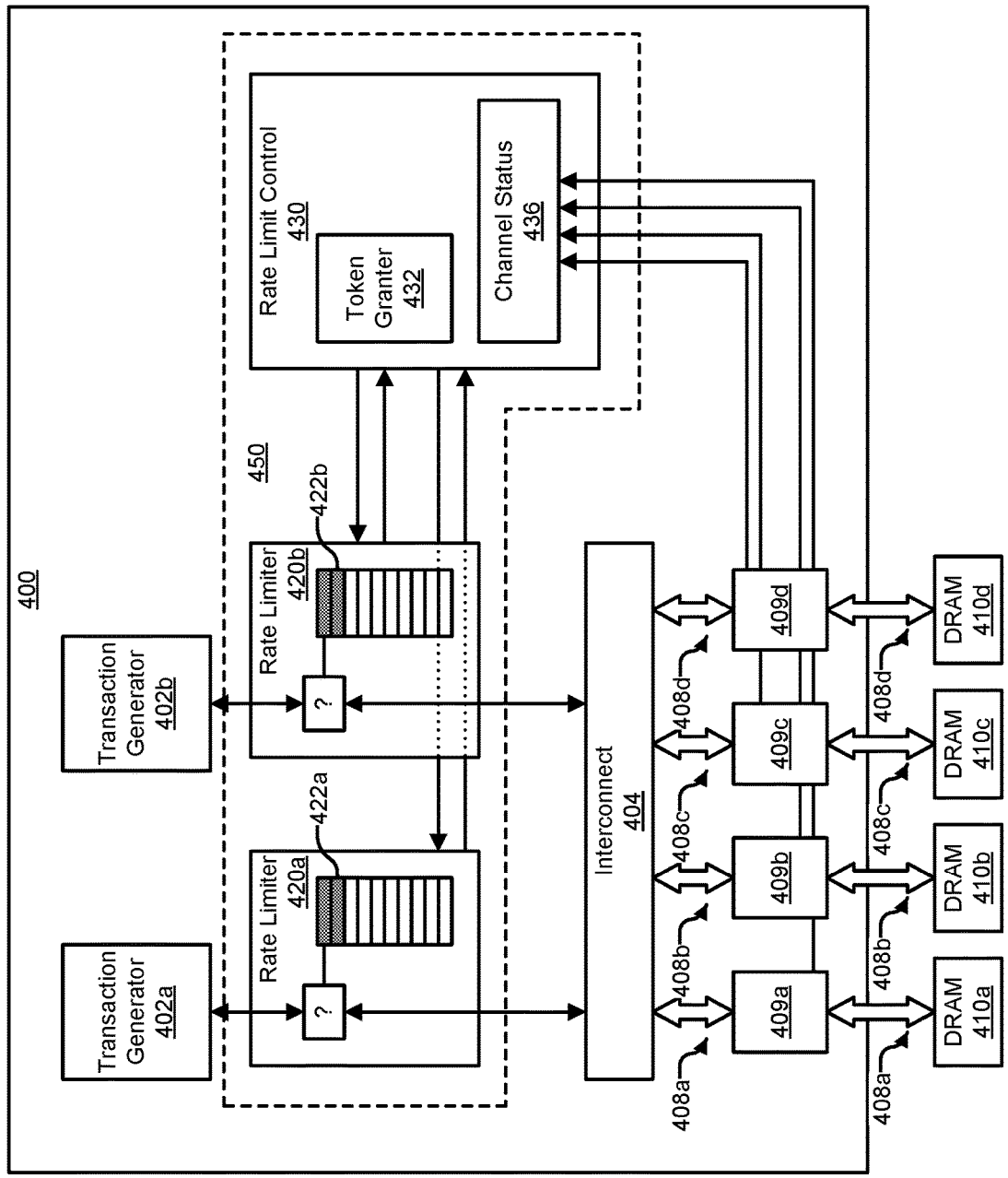
FIG. 4 illustrates an example of an integrated circuit that includes a rate limiting circuit that can monitor memory channel occupancy.

FIG. 4 illustrates an example of an integrated circuit 400 that includes a rate limiting circuit 450 that can monitor memory channel occupancy. The example integrated circuit 400 includes multiple transaction generators 402a-402b that can send memory transactions to processor memory (here illustrated as DRAM 410a-410d modules) located outside the integrated circuit 400. In other examples, the integrated circuit 400 can include more than two transaction generators and/or more than four memory channels and DRAM modules. The integrated circuit 400 also includes an interconnect 404 that enables the transfer of data between the transaction generators 402a-402b and the memory channels 408a-408d. In some examples, the interconnect 404 can include cache memory, which is not illustrated here.

In various implementations, the rate limiting circuit 450 can include rate limiter 420a-420b modules, one for each of the transaction generators 402a-402b, and a rate limiting control 430 module. The rate limiter 420a-420b modules can maintain counts of tokens 422a-422b for the transaction generator to which each rate limiter 420a-420b is assigned. The rate limiter 420a-420b modules can also determine whether a transaction from a transaction generator can be allowed to enter the interconnect 404, where the transaction is allowed when the transaction generator has enough tokens to transmit the transaction.

The rate limiting control 430 can determine when tokens should be added to the counts of tokens 422a-422b. To determine when tokens should be added, and which rate limiter 420a-420b should add a token, the rate limiting control 430 can include a token granter 432 module. In various implementations, the token granter 432 can determine whether the interval between token grants has passed.

In various implementations, the rate limiting control 430 can also include a channel status 436 module. The channel status 436 can receive status information from each of the memory channels 408a-408d. Each of the memory channels 408a-408d can include a buffer 409a-409d for temporarily storing transactions that are waiting to be sent to the DRAM 410a-410d. Channel status information can thus include the amount of space available in the buffers 409a-409d for additional transactions. Alternatively or additionally, the status information can include a count of the number of transactions in the buffers 409a-409d that are waiting to be sent to the DRAM 410a-410d. Alternatively or additionally, the status information can include a "channel full" or "channel empty" signals that can be generated by the buffers 409a-409d. Alternatively or additionally, the channel status information can include a signal sent when the buffer occupancy reaches certain levels (e.g., each time 5, 10, or some other number of transaction are added or removed) and/or each time a certain number of transactions are queued in the buffers 409a-409d or removed from the 409a-409d.

In various implementations, the rate limiting circuit 450 can use the channel status information to adjust the interval at which tokens are granted to the transaction generators 402a-402b. In the example of FIG. 4, the rate limiting control 430, for example using the channel status 436 module, can determine a combined amount of space available between all of the memory channels 408a-408d. For example, the channel status 436 can determine a total amount of available space, an average amount of available space, a median amount of available space, or some other combined value that indicates the available space across all the memory channels 408a-408d. Using the combined available memory channel occupancy, the rate limiting control 430, for example using the token granter 432, can adjust the token granting interval, and slow down or speed up the rate at which tokens are granted. For example, when the overall occupancy of the memory channels 408a-408d is high (e.g., there is little available space in the memory channels' buffers 409a-409d), the token granter 432 can increase the length of the interval. As a further example, when the overall occupancy is low, the token granter 432 can decrease the length of the interval.

In various implementations, the rate limiting control 430 can use different techniques for determining when to change the token granting interval and by how much the interval should be changed. For example, the rate limiting control 430 can use a high threshold and a low threshold. In this example, when the memory channel occupancy is greater than the high threshold, the rate limiting control 430 can increase the length of the interval. Then, when the occupancy falls below the low threshold, the rate limiting control 430 can again shorten the length of the interval. In this example, the high and low thresholds may be configurable (e.g., programmable by software). Additionally, the amount by which the interval is increased and decreased may be configurable.

As another example, in some implementations, the rate limiting control 430 may be able to adjust the token grant interval in a more gradual fashion. For example, the rate limiting control 430 can increase the token granting interval by a small amount for every 5, 10, or some other number of transactions that are queued in the memory channels 408a-408d, and can decrease the interval by a proportionate amount for every 5 or 10 (or some other amount) of transactions removed and sent to the DRAM 410a-410d.

As another example, in some implementations, the rate limiting control 430 can include a lookup table that can provide a token granting period for different memory channel occupancy conditions. For example, the rate limiting control 430 may be able to index the lookup table with a value that indicates the current memory channel occupancy or approximate memory channel occupancy (e.g., if the memory channel occupancy is 51%, a value of 50-55% can be used). In this example, the lookup table can output the number of clock cycles the rate limiting control 430 should wait until next granting tokens. The lookup table can be programmed, for example, by software.

In some implementations, the rate limiting control 430, for example using the channel status 436, can monitor the channel status on every clock cycle. In some implementations, the rate limiting control 430 may check the channel status periodically, such as at the end of each token granting interval.

By adapting to the instantaneous bandwidth, the rate limiting control 430 can attempt to ensure that the transaction generators 402a-402b do not use more bandwidth than is available. This can avoid the memory channels 408a-408d becoming full, pushing back on the interconnect 404, and triggering retries.

In the example of FIG. 4, a combined status of the memory channels is used to adjust the token granting interval. In some examples, only combined information may be available, or it may be determined that the combined information adequately reflects the memory channel usage.

Figure 5:
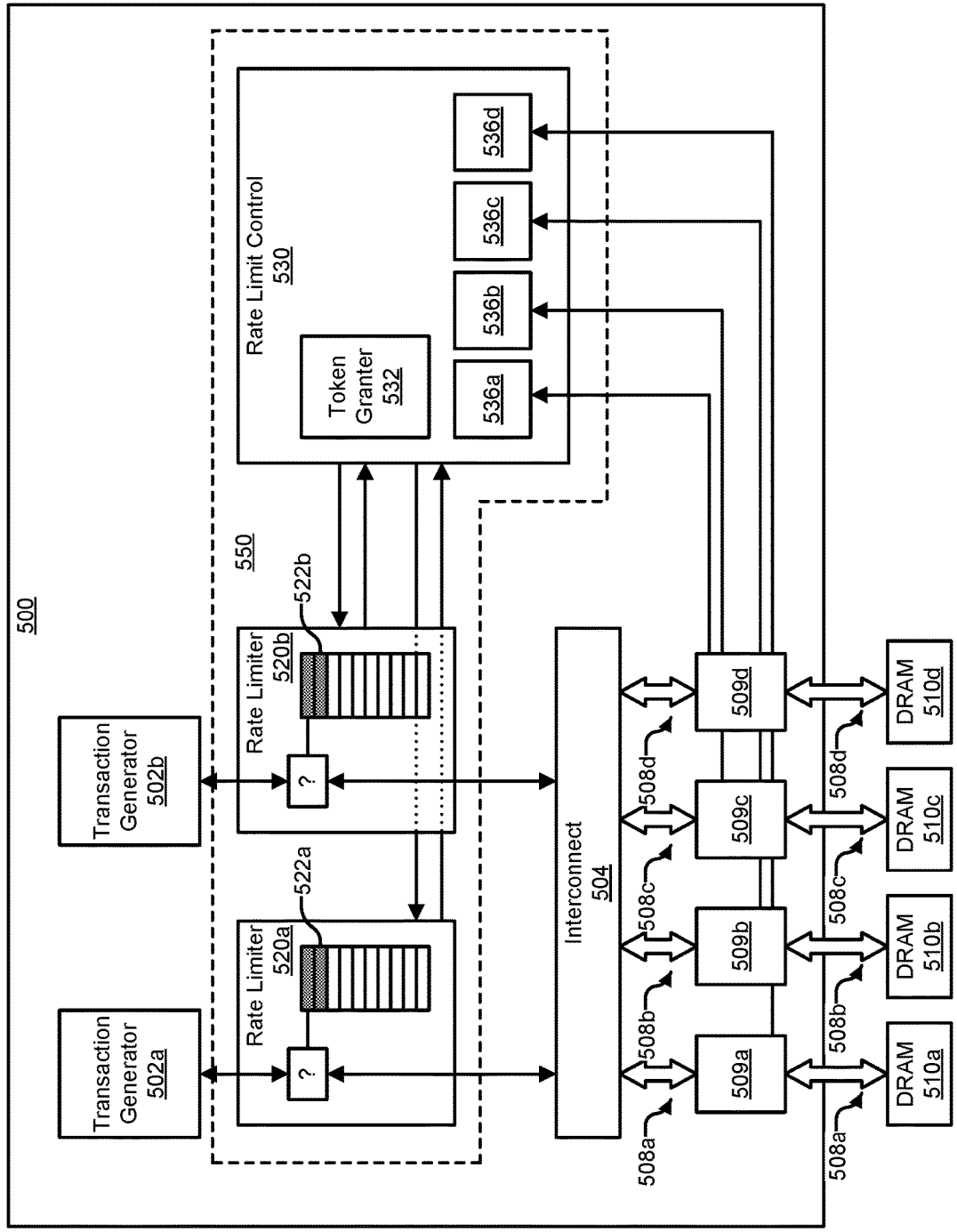
FIG. 5 illustrates an example of an integrated circuit that includes a rate limiting circuit that can monitor individual memory channel occupancy.

In some implementations, the individual occupancy of each memory channel may be monitored. FIG. 5 illustrates an example of an integrated circuit 500 that includes a rate limiting circuit 550 that can monitor individual memory channel occupancy. The example integrated circuit 500 includes multiple transaction generators 502a-502b that can send memory transactions to processor memory (here illustrated as DRAM 510a-510d modules) located outside the integrated circuit 500. In other examples, the integrated circuit 500 can include more than two transaction generators and/or fewer or more than four memory channels and DRAM modules. The integrated circuit 500 also includes an interconnect 504 that enables the transfer of data between the transaction generators 502a-502b and the memory channels 508a-508d. In some examples, the interconnect 504 can include cache memory, which is not illustrated here.

In various implementations, the rate limiting circuit 550 can include rate limiter 520a-520b modules, one for each of the transaction generators 502a-502b, and a rate limiting control 530 module. The rate limiter 520a-520b modules can maintain counts of tokens 522a-522b for the transaction generator to which each rate limiter 520a-520b is assigned. The rate limiter 520a-520b modules can also determine whether a transaction from a transaction generator can be allowed to enter the interconnect 504, where the transaction is allowed when the transaction generator has enough tokens to transmit the transaction.

The rate limiting control 530 can determine when tokens should be added to the counts of tokens 522a-522b. To determine when tokens should be added, and which rate limiter 520a-520b should add a token, the rate limiting control 530 can include a token granter 532 module. In various implementations, the token granter 532 can determine whether the interval between token grants has passed.

In various implementations, the rate limiting control 530 can include channel status 536a-536b modules, one for each of the memory channels 508a-508d. Each of the channel status 536a-536d modules can include receive status information from buffers 509a-509d in the memory channels 508a-508d. The memory channels 508a-508d can use the buffers 509a-509d. for temporarily storing transactions that are waiting to be sent to the DRAM 510a-510d. In various implementations, the buffers 509a-509d can provide channel status information, such as the amount of available space in the buffers 509a-509d and/or the amount of space in the buffers 509a-509d that is occupied. In some implementations, the channel status information can, alternatively or additionally, be read from the buffers 509a-509d or otherwise obtained from the buffers.

In various implementations, the individual channel status 536a-536b modules can act upon the channel status information for different channels. For example, a first channel status 536a module can receive channel status information from the first memory channel 508a, a second channel status 536b module can receive channel status information the second memory channel 508b, and a third and fourth channel status 536c-536d can do the same for the third and fourth memory channels 508c-508d, respectively The status information can include, for example, the current number of transactions buffered in the memory channel, the current available space in the memory channel for additional transactions, a full indicator, an empty indicator, and/or other information. In some examples, the channel status can be indicated by a signal toggling each time a transaction is queued in or removed from the memory channel.

In various implementations, the rate limiting control 530 can use the individual memory channel status information to adjust the token granting interval. For example, when one memory channel is nearly full, the rate limiting control 530, for example using the token granter 532, can increase the length of the token granting interval until the memory channel's occupancy decreases. Channel occupancy can be determined in different ways, and may be configurable. For example, the rate limiting control 530 can look at the total or average channel occupancy. As another example, the rate limiting control 530 may increase the interval when one, two, three, or four of the memory channels have reached a certain level of occupancy. As a further example, the rate limiting control 530 can decrease the interval one at least one or all of the memory channels are below a certain occupancy level.

In some implementations, the rate limiting control 530 may have some information about which transaction generators 502a-502b are using which of the memory channels 508a-508d. For example, software may be able to program the rate limiting control 530 with a mapping of the address spaces of the DRAM 510a-510d modules and a mapping of the address spaces assigned to each transaction generator (and/or virtual machine). Alternatively or additionally, software may be able to configure the rate limiting control 530 to indicate that certain transaction generators are assigned to certain memory channels. Using this or other information, the rate limiting control 530 may be able to adjust the token granting interval for specific transaction generators. For example, the address mappings can indicate that a first transaction generator 502a is using two memory channels 508a-508b. In this example, when the available space in the two memory channels 508a-508b falls below a certain amount, the rate limiting control 530, for example using the token granter 532, can increase the token granting interval for the first transaction generator 502a so that the first transaction generator 502a must slow down the rate at which the transaction generator issues transactions. In this example, the rate limiting control 530 can adjust the token granting interval for the first transaction generator 502a without also changing the interval for a second transaction generator 502b. Individually adjusting the token granting interval for each transaction generator 502a-502b may better ensure that the memory channels 508a-508d do not fill up and push back. A transaction generator that is using a large amount of bandwidth can also be forced to give up some of that bandwidth to other transaction generators.

Figure 6:
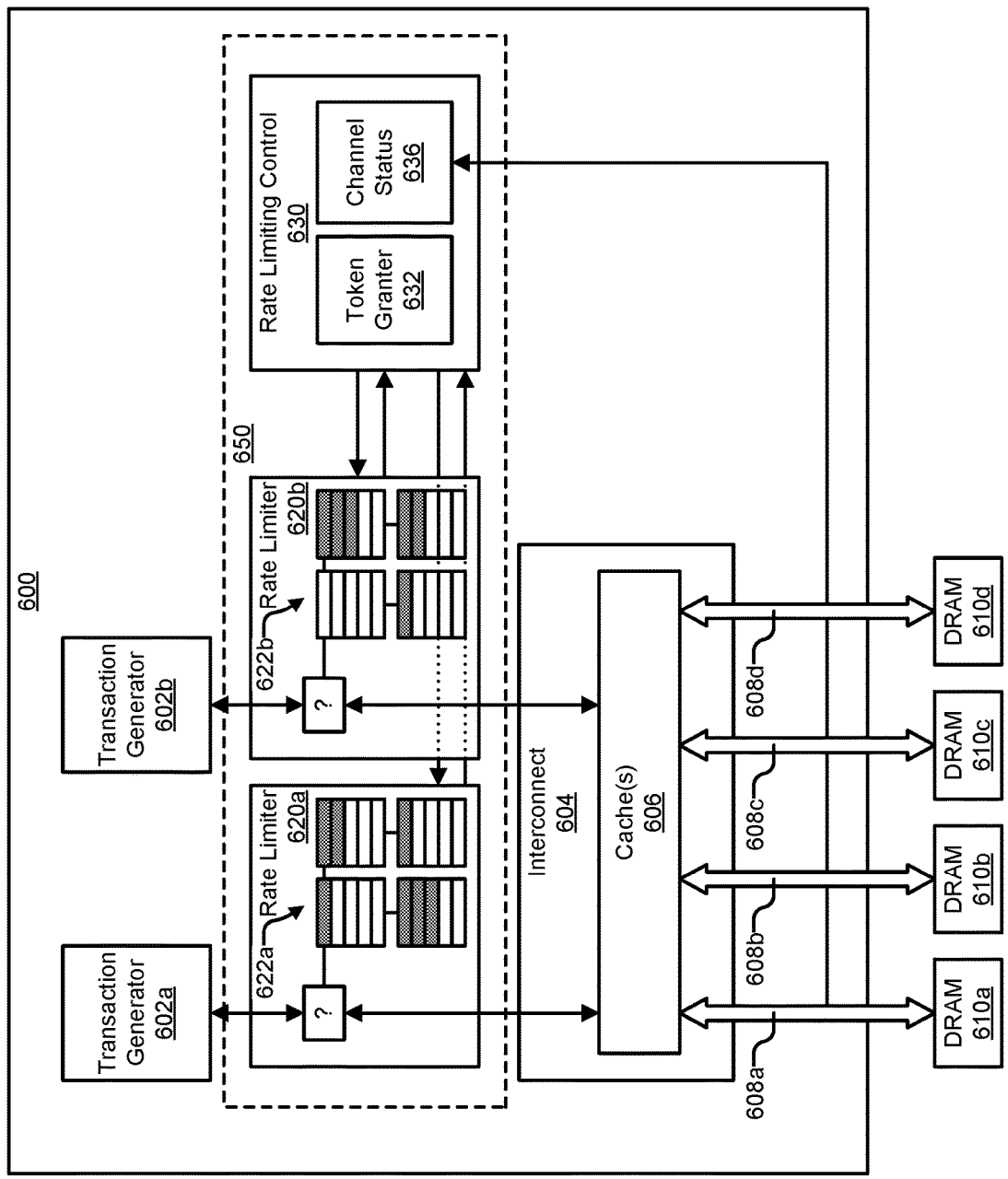
FIG. 6 illustrates an example of an integrated circuit that includes a rate limiting circuit that can throttle transactions on an individual memory channel basis.

In some implementations, a rate limiter circuit can limit the rate at which a transaction generator can send transactions to a particular channel. FIG. 6 illustrates an example of an integrated circuit 600 that includes a rate limiting circuit 650 that can throttle transactions on an individual memory channel basis. The example integrated circuit 600 includes multiple transaction generators 602a-602b that can send memory transactions to processor memory (here illustrated as DRAM 610a-610d modules) located outside the integrated circuit 600. In other examples, the integrated circuit 600 can include more than two transaction generators and/or fewer or more than four memory channels and DRAM modules. The integrated circuit 600 also includes an interconnect 604 that enables the transfer of data between the transaction generators 602a-602b and the memory channels 608a-608d. In some examples, the interconnect 604 can include cache memory 606, which can store data recently accessed by the transaction generators 602a-602b.

In various implementations, the rate limiting circuit 650 can include rate limiter 620a-620b modules, one for each of the transaction generators 602a-602b, and a rate limiting control 630 module. The rate limiter 620a-620b modules can maintain counts of tokens 622a-622b for the transaction generator to which each rate limiter 620a-620b is assigned.

In the example illustrated in FIG. 6, each of the rate limiter 620a-620b modules include a separate count of tokens 622a-622b for each of the memory channels 608a-

608d. That is, in each of the rate limiter 620a-620b modules, a count of tokens 622a-622b is assigned to a particular memory channel 608a-608d. When the rate limiter 620a-620b modules receive a transaction from the transaction generators 602a-602b, the rate limiter 620a-620b modules an determine which of the memory channel 608a-608d the transaction will be sent. The rate limiter 620a-620b modules can be, for example, configured with address maps for the memory channels 608a-608d, and can identify the destination memory channel by comparing the transaction address with the address maps. Alternatively or additionally, the transaction can include a field that identifies a destination memory channel. In other examples, other techniques can be used to identify the memory channel to which a transaction will go.

Once the rate limiter 620a-620b modules have identified the memory channel 608a-608d to which the transaction will be sent, the rate limiter 620a-620b module can check a count of tokens 622a-622b that is associated with the destination memory channel. When the designated count of tokens has enough tokens to send the transaction, the transaction will be allowed to enter the interconnect 604, and a token will be deducted from the count of tokens. When the count of tokens does not have enough tokens, the transaction will not be allowed to enter the interconnect 604, and no tokens will be deducted. In either case, token counts for other memory channels will not be checked or changed.

The rate limiting control 630 can determine when tokens should be added to the counts of tokens 622a-622b. To determine when and where tokens should be added, the rate limiting control 630 can include a token granter 632 module. In various implementations, the token granter 632 can determine whether the interval between token grants has passed. At the conclusion of each interval, the token granter 632 may instruct one or more of the rate limiter 620a-620b modules to add one or more tokens to the count of tokens 622a-622b. In some implementations, the tokens are added to all the counts of tokens 622a-622b in each of the rate limiters 620a-620b.

In some implementations, the rate limiting control 630 can selectively add tokens to the count of tokens 622a-622b assigned to different memory channels 608a-608d. For example, the rate limiting control 630 can include a channel status 636 module. In various implementations, the channel status 636 module can determine a status for each of the memory channels 608a-608d, where the channel status indicates how full or how empty the memory channels 608a-608d are, and/or possibly how quickly transactions are flowing through the memory channels 608a-608d. In some implementations, the channel status 636 module can determine the individual status for each of the memory channels 608a-608d. In some implementations, the channel status 636 module can, alternatively or additionally, determine a combined status across two or more of the memory channels 608a-608d.

The channel status can indicate whether the rate at which a particular memory channel is receiving should be slowed down. When this occurs, the rate limiting control 630 can, for example using the token granter 632, grant fewer tokens, or grant tokens less frequently, to counts of tokens 622a-622b that are assigned to the particular memory channel. Reducing the number of tokens available for a particular channel can force a transaction generator to send fewer transactions to the particular memory channel, while not affecting the transaction generator's ability to send transactions to other memory channels. In some examples, token granting is reduced for all the transaction generators 602a-602b. In some examples, token granting is reduced only for some transaction generators 602a-602b, such as ones that have been sending more transactions to the particular memory channel than others.

By controlling the rate at which transactions are allowed to reach each individual memory channel 608a-608d, usage of the memory channels 608a-608d can be optimized. Having the rate limiters 620a-620b allow transactions on a per-channel basis can, however, cause the order in which transactions reach the DRAM 610a-610d to be different from the order in which the transaction generators 602a-602b generated the transactions. For example, a first transaction may be destined for the first memory channel 608a, while a second, subsequent transaction will go to the second memory channel 608b. In this example, the transaction generator may not have enough tokens to send the first transaction, but may have enough tokens to send the second transaction. Should the second transaction be allowed to go ahead, the transaction will reach the processor memory before the first transaction does.

In some cases, changing the order of transactions has no effect on the outcome of the transactions or the operation of the transaction generator that issued the transactions. For example, the transactions may be for different address. In some cases, however, the order of the transactions is important. For example, the first transaction may write a value to an address while the second transaction reads a value from the same address. In this example, the read transaction may be reading old data. As another example, the second transaction may cause the cache 606 to evict data, and the first transaction may be for reading that data. In this example, when the first transaction enters the interconnect 604, the cache 606 may execute another eviction to re-fetch the data that was previously evicted.

In some implementations, transaction ordering can be handled by the transaction generators 602a-602b. The transaction generators 602a-602b can, for example, execute such that transaction dependencies are avoided or limited. For example, the transaction generators 602a-602b can ensure the dependent transactions only occur on within the same DRAM 610a-610d module.

In some implementations, the rate limiter 620a-620b modules can manage transaction dependencies. For example, when a transaction has been disallowed from entering the interconnect due to a count of tokens 622a for a particular memory channel being too low, the rate limiter 620a-620b can check subsequent transactions to see if these transactions are dependent on the disallowed transaction. A subsequent transaction may be depended on the disallowed transaction when the subsequent transaction is to the same address, the same cache line, or for another reason. In this example, dependent transactions can also be disallowed, regardless of whether the rate limiter module has enough tokens to send the transaction. In this example, once the disallowed transaction has been allowed, the rate limiter can stop checking subsequent transactions dependency on this transaction.

As another example, the rate limiter 620a-620b modules can be informed of dependencies between transactions by the transaction generators 602a-602b. For example, the transactions can include a field that identifies another transaction on which the transaction is dependent. In this example, the rate limiter can disallow a first transaction until a second transaction that the first transaction depends on has been allowed to enter the interconnect 604. Alternatively or additionally, the rate limiter may require that there be sufficient tokens for both transactions to be sent to the interconnect 604. In some cases, the first transaction and the second transaction in the previous example may be addressed to different memory channels, such that the requirement may mean that the count of tokens for two different memory channels needs to be large enough. Various other methods can be used to handle transaction ordering issues that can result from per-memory-channel rate limiting.

In various implementations, the rate limiting 650 can apply other techniques to the per-memory-channel counts of tokens 622a-622b. For example, tokens can be recycled to the individual counts of tokens 622a-622b in the same way as when the rate limiter 620a-620b modules have only one count of tokens.

Figure 7:
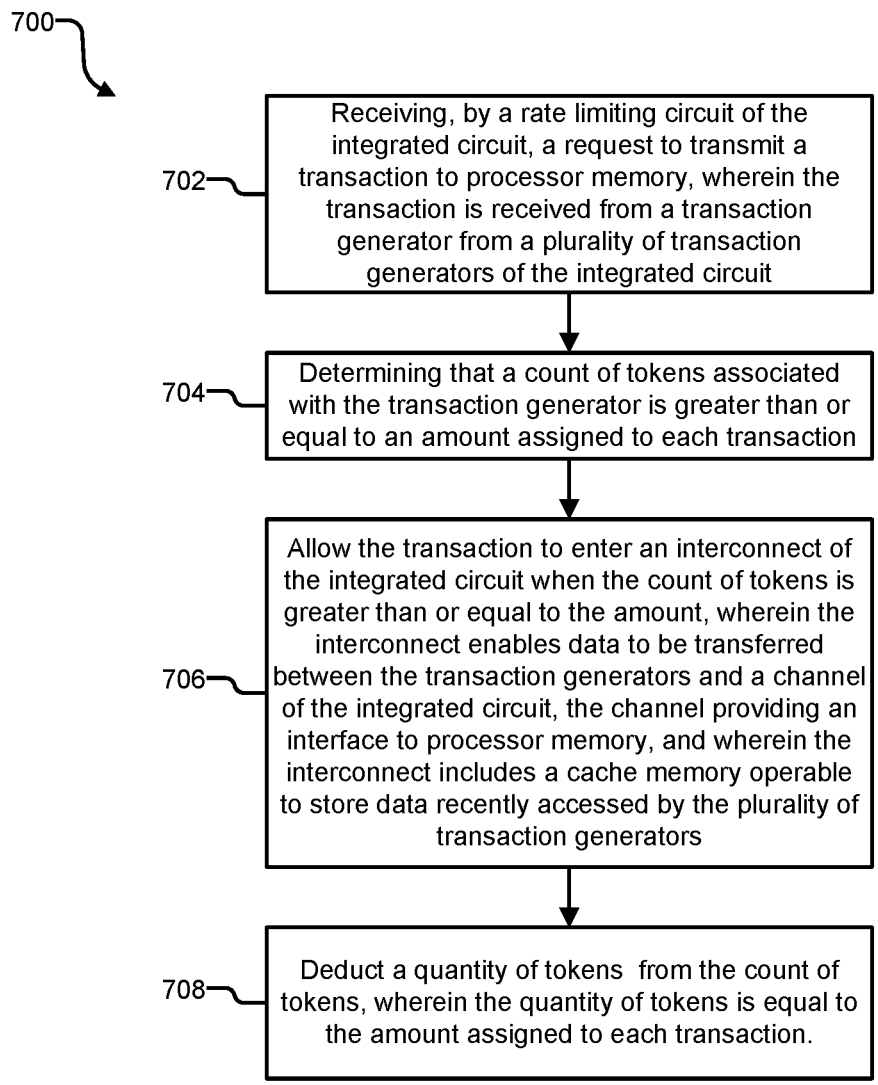
FIG. 7 illustrates an example of a process 700 for operating an integrated circuit.

FIG. 7 illustrates an example of a process 700 for operating an integrated circuit. This process 700 may be implemented by the integrated circuits described above, such as for example the integrated circuits illustrated in FIGS. 1, 2A, 2B, 3, 4, and 5.

At step 702, the process 700 includes receiving, by a rate limiting circuit of the integrated circuit, a request to transmit a transaction to processor memory, wherein the transaction is received from a transaction generator from a plurality of transaction generators of the integrated circuit. The transaction can be a processor memory transaction, with which the transaction generator can read data from processor memory or write data to processor memory.

At step 704, the process 700 includes determining that a count of tokens associated with the transaction generator is greater than or equal to an amount assigned to each transaction. In various implementations, the rate limiting circuit can maintain the count of tokens. In these and other implementations, the rate limiting circuit maintains a count of tokens for each transaction generator in the integrated circuit. For example the rate limiting circuit can include a rate limiter module for each transaction generator, where the rate limiter modules maintain the token counts for the transaction generator to which each rate limiter is assigned. The amount of tokens assigned to each transaction can be one token, two tokens, or some other number of tokens.

At step 706, the process 700 includes allowing the transaction to enter an interconnect of the integrated circuit, wherein the interconnect enables data to be transferred between the transaction generator and a channel of the integrated circuit, the channel providing an interface to processor memory, and wherein the interconnect includes a cache memory operable to store data recently accessed by the plurality of transaction generators.

In some implementations, when the transaction is allowed to enter the interconnect, the process 700 can further include determining that data associated with the transaction is not stored in the cache memory. In these implementations, the process 700 can further include determining that the transaction will be transferred to the channel based on the data not being in the cache memory.

In some implementations, the process 700 includes determining that data associated with the transaction is stored in the cache memory. In these cases, the transaction will not be transferred to the channel because the data can be read from or written to the cache memory. The process 700 thus further includes adding the quantity of tokens back to the count of tokens.

In some implementations, the process 700 can include determining that data associated with the transaction is not stored in the cache memory and that data that is stored in the cache memory is to be moved from the cache memory to the processor memory to make space for the data associated with the transaction. In these cases, the process 700 can include deducting an additional quantity of tokens from the count of tokens for the data stored in the cache memory being moved from the cache memory.

At step 708, the process 700 includes deducting a quantity of tokens from the count of tokens when the transaction is allowed to enter the interconnect, wherein the quantity is equal to the amount assigned to each transaction.

In various implementations, the process 700 can further include receiving a second request to transmit a second transaction. The second request may be from a second transaction generator. In these implementations, the process 700 can further including determining that a second count of tokens associated with the second transaction generator is less than the amount assigned to each transaction. In this case, the process 700 include denying the second transaction from entering the interconnect, based on the second count of tokens being less than the amount assigned to each transaction. The transaction generator can try the transaction again later, possible after additional tokens are added to the count.

Figure 8:
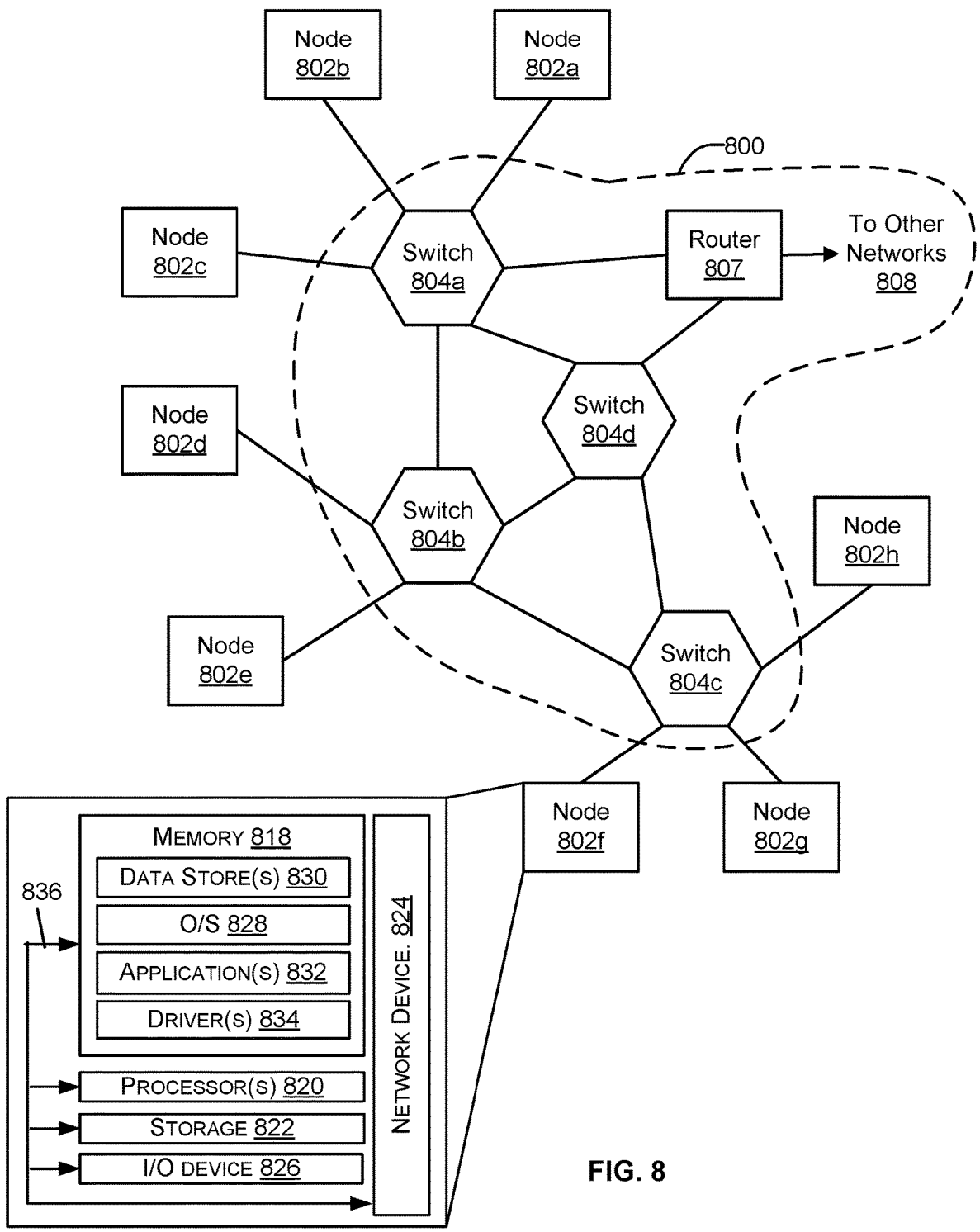
FIG. 8 illustrates an example architecture for features and systems described herein that includes one or more service provider computers and/or a user device connected via one or more networks, according to certain aspects of the disclosure.

FIG. 8 illustrates a network 800, illustrating various different types of network devices, such as nodes comprising the network device, switches and routers. In certain embodiments, the network 800 may be based on a switched architecture with point-to-point links. As illustrated in FIG. 8, the network 800 includes a plurality of switches 804a-804d, which may be arranged in a network. In some cases, the switches are arranged in a multi-layered network, such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. Switches 804a-804d may be connected to a plurality of nodes 802a-802h and provide multiple paths between any two nodes.

The network 800 may also include one or more network devices for connection with other networks 808, such as other subnets, LANs, wide area networks (WANs), or the Internet, and may be referred to as routers 806. Routers use headers and forwarding tables to determine the best path for forwarding the packets, and use protocols such as internet control message protocol (ICMP) to communicate with each other and configure the best route between any two devices.

In some examples, network(s) 800 may include any one or a combination of many different types of networks, such as cable networks, the Internet, wireless networks, cellular networks and other private and/or public networks. Interconnected switches 804a-804d and router 806, if present, may be referred to as a switch fabric, a fabric, a network fabric, or simply a network. In the context of a computer network, terms "fabric" and "network" may be used interchangeably herein.

Nodes 802a-802h may be any combination of host systems, processor nodes, storage subsystems, and I/O chassis that represent user devices, service provider computers or third party computers.

User devices may include computing devices to access an application 832 (e.g., a web browser or mobile device application). In some aspects, the application 832 may be hosted, managed, and/or provided by a computing resources service or service provider. The application 832 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 808. Additionally, the user device(s) may be part of the distributed system managed by, controlled by, or otherwise part of the service provider computer(s) (e.g., a console device integrated with the service provider computers).

The node(s) of FIG. 8 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some embodiments, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 832 and/or cloud-based software services. These computers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 802*a*-802*h* may include at least one memory 818 and one or more processing units (or processor(s) 820). The processor(s) 820 may be implemented in hardware, computer-executable instructions, firmware, or combinations thereof. Computer-executable instruction or firmware implementations of the processor(s) 820 may include computer-executable or machine-executable instructions written in any suitable programming language to perform the various functions described.

In some instances, the hardware processor(s) 820 may be a single core processor or a multi-core processor. A multi-core processor may include multiple processing units within the same processor. In some embodiments, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 818 may store program instructions that are loadable and executable on the processor(s) 820, as well as data generated during the execution of these programs. Depending on the configuration and type of the node(s) 802*a*-802*h*, the memory 818 may be volatile (such as RAM) and/or non-volatile (such as ROM, flash memory, etc.). The memory 818 may include an operating system 828, one or more data stores 830, one or more application programs 832, one or more drivers 834, and/or services for implementing the features disclosed herein.

The operating system 828 may support nodes 802*a*-802*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 828 may also be a proprietary operating system.

The data stores 830 may include permanent or transitory data used and/or operated on by the operating system 828, application programs 832, or drivers 834. Examples of such data include web pages, video data, audio data, images, user data, and so on. The information in the data stores 830 may, in some implementations, be provided over the network(s) 808 to user devices. In some cases, the data stores 830 may additionally or alternatively include stored application programs and/or drivers. Alternatively or additionally, the data stores 830 may store standard and/or proprietary software libraries, and/or standard and/or proprietary application user interface (API) libraries. Information stored in the data stores 830 may be machine-readable object code, source code, interpreted code, or intermediate code.

The drivers 834 include programs that may provide communication between components in a node. For example, some drivers 834 may provide communication between the operating system 828 and additional storage 822, network device 824, and/or I/O device 826. Alternatively or additionally, some drivers 834 may provide communication between application programs 832 and the operating system 828, and/or application programs 832 and peripheral devices accessible to the service provider computer. In many cases, the drivers 834 may include drivers that provide well-understood functionality (e.g., printer drivers, display drivers, hard disk drivers, Solid State Device drivers). In other cases, the drivers 834 may provide proprietary or specialized functionality.

The service provider computer(s) or servers may also include additional storage 822, which may include removable storage and/or non-removable storage. The additional storage 822 may include magnetic storage, optical disks, solid state disks, flash memory, and/or tape storage. The additional storage 822 may be housed in the same chassis as the node(s) 802*a*-802*h* or may be in an external enclosure. The memory 818 and/or additional storage 822 and their associated computer-readable media may provide non-volatile storage of computer-readable instructions, data structures, program modules, and other data for the computing devices. In some implementations, the memory 818 may include multiple different types of memory, such as SRAM, DRAM, or ROM.

The memory 818 and the additional storage 822, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 818 and the additional storage 822 are examples of computer storage media. Additional types of computer storage media that may be present in the node(s) 802a-802h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 802a-802h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 802a-802h may also include I/O device(s) 826, such as a keyboard, a mouse, a pen, a voice input device, a touch input device, a display, speakers, a printer, and the like. The node(s) 802a-802h may also include one or more communication channels 836. A communication channel 836 may provide a medium over which the various components of the node(s) 802a-802h can communicate. The communication channel or channels 836 may take the form of a bus, a ring, a switching fabric, or a network.

The node(s) 802a-802h may also contain network device(s) 824 that allow the node(s) 802a-802h to communicate with a stored database, another computing device or server, user terminals and/or other devices on the network(s) 800.

In some implementations, the network device 824 is a peripheral device, such as a PCI-based device. In these implementations, the network device 824 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 824 may be connected to a computing system using a PCIe interface.

A PCI-based device may include one or more functions. A "function" describes operations that may be provided by the network device 824. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 824 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit for a processor, comprising:
   a channel to a processor memory;
   transaction generators, wherein each transaction generator is an integrated circuit component that is operable to generate transactions to the processor memory;
   an interconnect coupled to the channel and the transaction generators, wherein the interconnect enables transactions to be transferred from the transaction generators to the channel and responses from processor memory to be transferred from the channel to the transaction generators, and wherein the interconnect includes a cache memory operable to store data recently accessed by the transaction generators; and
   a rate limiting circuit configured to:
      maintain a separate count of tokens for each transaction generator of the transaction generators, wherein tokens are added to the separate count of tokens for each transaction generator at a pre-determined interval;
      upon receiving, from a transaction generator, a request to transmit a transaction, determine that a count of tokens associated with the transaction generator is greater than zero and thus sufficient to allow the transaction to enter the interconnect;
      allow the transaction to enter the interconnect; and
      deduct a token from the separate count of tokens for the transaction generator,
      wherein the rate limiting circuit is further configured to:
         determine to add a token to a first count of tokens associated with a first transaction generator from a first set of transaction generators;
         determine, before adding the token, that the first count of tokens associated with the first transaction generator is equal to a maximum value;
         determine that a second count of tokens associated with a second transaction generator from the first set of transaction generators is less than the maximum value; and
         add the token to the second count of tokens associated with the second transaction generator.

2. The integrated circuit of claim 1, wherein the rate limiting circuit is further configured to:
   upon receiving, from a second transaction generator, a second request to transmit a second transaction, determine that a second count of tokens is equal to zero and thus insufficient; and
   disallow the second transaction from entering the interconnect.

3. The integrated circuit of claim 1, further comprising:
   a clock input;
   wherein the rate limiting circuit is further configured to:
      determine the pre-determined interval, wherein the pre-determined interval is based on a bandwidth of the channel and a frequency of the clock input, and wherein the pre-determined interval is determined to evenly distribute the bandwidth between the transaction generators.

4. An integrated circuit, comprising:
   a channel to a processor memory;
   transaction generators, wherein each transaction generator comprises a circuit that is operable to generate transactions to the processor memory;
   an interconnect coupled to the channel and the transaction generators, wherein the interconnect enables data to be exchanged between the transaction generators and the channel, and wherein the interconnect includes a cache memory for the transaction generators; and
   a rate limiting circuit configured to:
      upon receiving, from one of the transaction generators, a request to transmit a transaction, determine whether a count of tokens associated with the one of the transaction generators is greater than or equal to a token amount assigned to the transaction;
      allow the transaction to enter the interconnect when the count of tokens associated with the one of the transaction generators is greater than or equal to the token amount assigned to the transaction; and
      deduct the token amount from the count of tokens associated with the one of the transaction generators when the transaction is allowed to enter the interconnect,
      wherein the rate limiting circuit is further configured to:
         determine to add a token to a first count of tokens associated with a first transaction generator from a first set of transaction generators;
         determine, before adding the token, that the first count of tokens associated with the first transaction generator is equal to a maximum value;
         determine that a second count of tokens associated with a second transaction generator from the first set of transaction generators is less than the maximum value; and
         add the token to the second count of tokens associated with the second transaction generator.

5. The integrated circuit of claim 4, wherein the rate limiting circuit is further configured to:
increase the count of tokens at pre-determined intervals of time.

6. The integrated circuit of claim 5, wherein the channel has a bandwidth, wherein a portion of the bandwidth is allocated to each of the transaction generators, and wherein the pre-determined interval of time is based on the bandwidth allocated to each of the transaction generators.

7. The integrated circuit of claim 4, wherein the first set of transaction generators are configured to support a virtual machine.

8. The integrated circuit of claim 4, wherein the transaction generators comprise a first set of transaction generators configured to support a first virtual machine, and a second set of transaction generators configured to support a second virtual machine, and wherein the rate limiting circuit is further configured to:
determine to add a token to a first count of tokens associated with a first transaction generator from the first set of transaction generators;
determine, before adding the token, that all counts of tokens associated with each transaction generator from the first set of transaction generators are equal to a maximum value;
determining that a second count of tokens associated with a second transaction generator from the second set of transaction generators is less than the maximum value; and
add the token to the second count of tokens.

9. The integrated circuit of claim 4, wherein the rate limiting circuit is further configured to:
determine to add a token to the count of tokens associated with the one of the transaction generators;
determine, before adding the token, that the count of tokens is equal to a maximum value; and
discard the token.

10. The integrated circuit of claim 4, wherein the rate limiting circuit is further configured to:
upon allowing the transaction to enter the interconnect, determine that data associated with the transaction is in the cache memory; and
add the token amount back to the count of tokens based on the data being in the cache memory.

11. The integrated circuit of claim 4, wherein the channel has a bandwidth, and wherein rate limiting circuit is further configured to:
determine an amount of bandwidth to allocate to each of the transaction generators, wherein determining the amount of bandwidth includes dividing the bandwidth by a count of the transaction generators; and
determine an interval for adding tokens to token counts associated with the transaction generators by dividing the amount of bandwidth among the transaction generators, and wherein the tokens are added once per the interval.

12. The integrated circuit of claim 11, wherein the channel includes a buffer for temporary storage of transactions, and wherein the rate limiting circuit is further configured to:
determine that a number of transactions in the buffer is greater than a threshold; and
increase the interval to decrease a rate at which the tokens are added to the count of tokens.

13. The integrated circuit of claim 11, wherein the bandwidth is divided unequally between the transaction generators, and wherein the rate limiting circuit determines different intervals for the transaction generators.

14. The integrated circuit of claim 4, further comprising:
a plurality of channels including the channel, wherein each channel from the plurality of channels includes a buffer for temporary storage of transactions;
wherein the rate limiting circuit is further configured to:
determine an interval for adding tokens to token counts associated with the transaction generators, wherein the tokens are added once per the interval;
determine, at a point in time, a combined amount of available space in the buffers; and
adjust the interval according to the combined amount of available space.

15. The integrated circuit of claim 4, further comprising:
a plurality of channels including the channel, wherein each channel from the plurality of channels includes a buffer for temporary storage of transactions;
wherein the rate limiting circuit is further configured to:
maintain a set of tokens counts for each transaction generator, where each token count in a set of token counts is associated with a channel from the plurality of channels, and wherein tokens are added to the token count based on an amount of available space in a buffer of a channel associated with the token count.

16. The integrated circuit of claim 4, wherein the rate limiting circuit comprises:
a rate limiter circuit for each transaction generator, wherein each rate limiter circuit is operable to maintain a token count for each respective transaction generator, and wherein each rate limiter circuit is operable to determine whether a transaction from a respective transaction generator should be allowed to enter the interconnect; and
a rate limiting control circuit operable to grant tokens to each rate limiter circuit.

17. A method, comprising:
receiving, by a rate limiting circuit of an integrated circuit, a request to transmit a transaction to processor memory, wherein the transaction is received from a first transaction generator from a plurality of transaction generators of the integrated circuit;
determining that a count of tokens associated with the first transaction generator is greater than or equal to an amount assigned to each transaction;
allowing the transaction to enter an interconnect of the integrated circuit based on the count of tokens associated with the first transaction generator being greater than or equal to the amount, wherein the interconnect enables data to be transferred between the plurality of transaction generators and a channel of the integrated circuit, the channel providing an interface to processor memory, and wherein the interconnect includes a cache memory operable to store data recently accessed by the plurality of transaction generators; and
deducting a quantity of tokens from the count of tokens associated with the first transaction generator, wherein the quantity of tokens is equal to the amount assigned to each transaction,
wherein the method further comprises:
determining, by the rate limiting circuit, to add a token to a first count of tokens associated with the first transaction generator;
determining, before adding the token, that the first count of tokens associated with the first transaction generator is equal to a maximum value;

determining that a second count of tokens associated with a second transaction generator from the plurality of transaction generators is less than the maximum value; and adding the token to the second count of tokens associated with the second transaction generator.

18. The method of claim 17, further comprising:

receiving a second request to transmit a transaction from a second transaction generator from the plurality of transaction generators;

determining that a second count of tokens associated with the second transaction generator is less than the amount assigned to each transaction; and denying the transaction from the second transaction request from entering the interconnect based on the second count of tokens being less than the amount assigned to each transaction.

19. The method of claim 17, further comprising:

determining, when the transaction is allowed to enter the interconnect, that data associated with the transaction is stored in the cache memory, wherein the transaction will not be transferred to the channel based on the data being in the cache memory; and adding the quantity of tokens back to the count of tokens.

20. The method of claim 17, further comprising:

determining, when the transaction is allowed to enter the interconnect, that data associated with the transaction is not stored in the cache memory;

determining that data stored in the cache memory is to be moved from the cache memory to the processor memory to make space for the data associated with the transaction; and deducting an additional quantity of tokens from the count of tokens for the data stored in the cache memory being moved from the cache memory.

* * * * *